US012781505B2

(12) United States Patent
Zheng et al.

(10) Patent No.: US 12,781,505 B2
(45) Date of Patent: Nov. 3, 2026

(54) ROOFING MATERIAL, AND ROOF SYSTEM INCLUDING THE ROOFING MATERIAL

(71) Applicant: BMIC LLC, Dallas, TX (US)

(72) Inventors: Yan Zheng, Parsippany, NJ (US); Adem Chich, Kearny, NJ (US); Yixi Xiao, Parsippany, NJ (US); Joshua Tingley, Morris Plains, NJ (US); Andrew Erick Andrade, Hackensack, NJ (US); Michael Dougherty, Mount Arlington, NJ (US)

(73) Assignee: BMIC LLC, Dallas, TX (US)

( * ) Notice: Subject to any disclaimer, the term of this patent is extended or adjusted under 35 U.S.C. 154(b) by 121 days.

(21) Appl. No.: 19/008,416

(22) Filed: Jan. 2, 2025

(65) Prior Publication Data

US 2025/0198155 A1 Jun. 19, 2025

Related U.S. Application Data

(63) Continuation of application No. 18/597,630, filed on Mar. 6, 2024, now Pat. No. 12,215,503.

(Continued)

(51) Int. Cl.

| | |
|---|---|
| ***E04D 5/10*** | (2006.01) |
| ***B32B 5/02*** | (2006.01) |
| ***B32B 7/08*** | (2019.01) |
| ***B32B 25/10*** | (2006.01) |
| ***B32B 25/20*** | (2006.01) |

(Continued)

(52) U.S. Cl.

CPC ................ *E04D 5/10* (2013.01); *B32B 5/028* (2013.01); *B32B 7/08* (2013.01); *B32B 25/10* (2013.01); *B32B 25/20* (2013.01); *E04D 5/148* (2013.01); *B32B 2419/06* (2013.01); *E04D 5/144* (2013.01); *E04D 13/1407* (2013.01)

(58) Field of Classification Search

CPC ................ B32B 2419/06; B32B 27/32; B32B 2307/7265; B32B 27/12; B32B 7/12; B32B 5/028; B32B 25/10; E04D 5/148; E04D 5/142; E04D 5/06; E04D 5/12; E04D 5/10; E04D 5/144; E04D 13/1407

See application file for complete search history.

(56) References Cited

U.S. PATENT DOCUMENTS

| | | | |
|---|---|---|---|
| 4,668,315 | A | 5/1987 | Brady et al. |
| 5,093,171 | A | 3/1992 | Sheahan |

(Continued)

FOREIGN PATENT DOCUMENTS

| | | | |
|---|---|---|---|
| KR | 10-2017-0001937 | A | 1/2017 |

*Primary Examiner* — Brian E Glessner

*Assistant Examiner* — Daniel J Kenny

(74) *Attorney, Agent, or Firm* — GREENBERG TRAURIG, LLP

(57) ABSTRACT

A system including a first roofing material installed on the roof deck; a second roofing material installed on the roof deck, adjacent to the first roofing material, where the second roofing material includes: a first layer comprising silicone; and a first substrate, where the first layer partially covers a surface of the first substrate, thereby to provide at least a first area of the surface of the first substrate not covered by the first layer, where the first roofing material overlaps at least a portion of the first area; and a flashing material including silicone, where the flashing material covers a portion of each of: the first roofing material, and the first layer of the second roofing material.

10 Claims, 14 Drawing Sheets

Related U.S. Application Data

(60) Provisional application No. 63/512,224, filed on Jul. 6, 2023, provisional application No. 63/450,699, filed on Mar. 8, 2023.

(51) Int. Cl.
*E04D 5/14* (2006.01)
*E04D 13/14* (2006.01)

(56) References Cited

U.S. PATENT DOCUMENTS

| | | | |
|---|---|---|---|
| 5,843,552 | A | 12/1998 | Karrfalt |
| 6,426,129 | B1 * | 7/2002 | Kalwara .................... C09J 7/22 428/491 |
| 6,679,018 | B2 | 1/2004 | Georgeau et al. |
| 6,701,685 | B2 | 3/2004 | Rippey |
| 7,441,381 | B2 | 10/2008 | Scheirer |
| 7,803,239 | B2 | 9/2010 | Scheirer |
| 8,701,367 | B2 | 4/2014 | Georgeau |
| 8,709,565 | B2 * | 4/2014 | Kalwara ................. E04D 5/148 52/309.1 |
| 2003/0015275 | A1 | 1/2003 | Phillips |
| 2004/0083673 | A1 | 5/2004 | Kalkanoglu |
| 2007/0026183 | A1 | 2/2007 | Hubbard |
| 2007/0186505 | A1 | 8/2007 | Hubbard |
| 2010/0200148 | A1 | 8/2010 | Douglas |
| 2011/0009024 | A1 | 1/2011 | Clark |
| 2015/0075901 | A1 | 3/2015 | Beresowski |
| 2016/0101590 | A1 | 4/2016 | Kane |
| 2016/0362894 | A1 | 12/2016 | McGraw et al. |
| 2020/0270866 | A1 | 8/2020 | Yancey et al. |
| 2023/0010965 | A1 | 1/2023 | Vega-Gutierrez et al. |

* cited by examiner

ROOFING MATERIAL, AND ROOF SYSTEM INCLUDING THE ROOFING MATERIAL

CROSS-REFERENCE TO RELATED APPLICATIONS

This application is a continuation of U.S. application Ser. No. 18/597,630, titled "HYBRID MEMBRANE SYSTEM FOR FLEXIBLE ROOFING INSTALLATION," filed Mar. 6, 2024, which claims priority to U.S. provisional application No. 63/450,699, titled "HYBRID MEMBRANE SYSTEM FOR FLEXIBLE ROOFING INSTALLATION," filed Mar. 8, 2023, and U.S. provisional application No. 63/512,224, titled "ROOFING MATERIAL, AND ROOF SYSTEM INCLUDING THE ROOFING MATERIAL," filed Jul. 6, 2023, the disclosures of which are incorporated by reference herein in their entireties.

FIELD

The present invention is directed to a roofing material, and, in particular, to a roofing material installed above a roof deck.

BACKGROUND

Roofing materials are installed on a roof deck of a building, to protect the roof deck itself as well as an interior of the building from damage caused by weather, including moisture from precipitation.

SUMMARY OF THE INVENTION

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a roll of roofing material that includes a substrate having a first side and a second side opposite to the first side, a membrane layer attached to the first side of the substrate, and an adhesive layer attached to the second side of the substrate, wherein the substrate is exposed on at least a portion of the first side of the substrate, such that at least the membrane layer does not cover the at least a portion of the first side of the substrate that is exposed.

In some embodiments, the substrate is exposed on at least a portion of the second side of the substrate, such that at least the adhesive layer does not cover the at least a portion of the second side of the substrate that is exposed.

In some embodiments, the substrate is exposed on at least two portions of the first side of the substrate, such that at least the membrane layer does not cover the at least two portions of the first side of the substrate that are exposed. In some embodiments, at least a portion of the adhesive layer is exposed, such that at least the substrate does not cover the at least a portion of the adhesive layer that is exposed.

In some embodiments, the substrate comprises at least one of a scrim, a fiberglass mat, or a polyester mat.

In some embodiments, the membrane layer comprises a fully cured membrane comprising an elastomer.

In some embodiments, the elastomer comprises silicone, acrylate, polyurethane, or a combination thereof.

In some embodiments, the membrane layer has a thickness of 5 mils to 100 mils.

In some embodiments, the membrane layer has a thickness of 10 mils to 30 mils.

In some embodiments, the adhesive layer has a thickness of 1 mil to 100 mils.

In some embodiments, the adhesive layer has a thickness of 5 mils to 30 mils.

In some embodiments, the present invention provides a roofing system that includes (a) a roof deck, (b) a first roofing material applied onto the roof deck, the first roofing material including (i) a substrate having a first side and a second side opposite to the first side, (ii) a membrane layer attached to the first side of the substrate, and (iii) an adhesive layer attached to the second side of the substrate, wherein the substrate is exposed on at least a portion of the first side of the substrate, such that at least the membrane layer does not cover the at least a portion of the first side of the substrate that is exposed, and (c) a second roofing material applied onto the roof deck, the second roofing material including (i) a substrate having a first side and a second side opposite to the first side, (ii) a membrane layer attached to the first side of the substrate, and (iii) an adhesive layer attached to the second side of the substrate.

In some embodiments, the second roofing material at least partially overlaps the first roofing material along the at least a portion of the first side of the substrate of the first roofing material that is exposed.

In some embodiments, the substrate of the second roofing material is exposed on at least a portion of the first side of the substrate of the second roofing material, such that at least the membrane layer of the second roofing material does not cover the at least a portion of the first side of the substrate of the second roofing material that is exposed.

In some embodiments, the at least a portion of the first side of the substrate of the second roofing material that is exposed at least partially overlaps the first roofing material along the at least a portion of the first side of the substrate of the first roofing material that is exposed.

In some embodiments, the second roofing material is applied adjacent to the first roofing material with a separate mesh strip connecting the first roofing material to the second roofing material.

In some embodiments, (i) the adhesive layer of the first roofing material overlaps the separate mesh strip and (ii) the adhesive layer of the second roofing material overlaps the separate mesh strip In some embodiments, the roofing system further comprises a flashing grade membrane applied along any spaces between the first roofing material and the second roofing material.

In some embodiments, the flashing grade membrane comprises a fluid flashing material that is applied along any spaces between the first roofing material and the second roofing material and thereafter cured.

In some embodiments, the present invention provides a method of installing a roofing material onto a roofing surface, comprising: (a) obtaining a first roofing material comprising (i) a substrate having a first side and a second side opposite to the first side, (ii) a membrane layer attached to the first side of the substrate, and (iii) an adhesive layer attached to the second side of the substrate, wherein the substrate is exposed on at least a portion of the first side of the substrate, such that at least the membrane layer does not cover the at least a portion of the first side of the substrate that is exposed, (b) obtaining a second roofing material comprising (i) a substrate having a first side and a second side opposite to the first side, (ii) a membrane layer attached to the first side of the substrate, and (iii) an adhesive layer attached to the second side of the substrate, (c) applying the first roofing material to a roof deck, and (d) applying the second roofing material to the roof deck.

In some embodiments, the second roofing material at least partially overlaps the first roofing material along the at least a portion of the first side of the substrate of the first roofing material that is exposed.

In some embodiments, the method further includes applying a separate mesh strip between the first roofing material and the second roofing material, such that (i) the adhesive layer of the first roofing material overlaps the separate mesh strip and (ii) the adhesive layer of the second roofing material overlaps the separate mesh strip.

In some embodiments, the method further includes applying a fluid flashing material along any spaces between the first roofing material and the second roofing material to fill any spaces between the first roofing material and the second roofing material by curing the fluid flashing material into a flashing grade membrane.

In some embodiments, the applying a fluid flashing material along any spaces between the first roofing material and the second roofing material includes spreading the fluid flashing material on each side of the first roofing material and the second roofing material to create waterproof seals.

In some embodiments, the spreading of the fluid flashing material on each side of the first roofing material and the second roofing material is conducted by spreading the fluid flashing material from 1 inch to 4 inches on each side of the first roofing material and the second roofing material to create the waterproof seals.

In some embodiments, the present invention provides a system, comprising: a roof deck comprising a first portion, and a second portion adjacent the first portion; a first roofing material above the first portion of the roof deck; and a second roofing material above the second portion of the roof deck, adjacent to the first roofing material, wherein the second roofing material comprises: a first membrane layer, wherein the first membrane layer comprises silicone; and a first substrate, wherein the first membrane layer partially covers a surface of the first substrate, thereby to provide at least a first area of the surface of the first substrate not covered by the first membrane layer, wherein the first roofing material overlaps at least a portion of the first area; and a flashing material, wherein the flashing material comprises silicone, wherein the flashing material is on each of the first roofing material, the first membrane layer of the second roofing material, and the first area of the second roofing material.

In some embodiments, the first area is at a first edge of the second roofing material.

In some embodiments, the first membrane layer partially covers a surface of the first substrate, thereby to provide a second area of the first substrate not covered by the first membrane layer, wherein the second area is at a second edge of the second roofing material.

In some embodiments, the second roofing material further comprises a third membrane layer, wherein the third membrane layer comprises silicone, wherein the third membrane layer at least partially covers a surface of the first substrate opposite the surface covered by the first membrane layer.

In some embodiments, the system further comprises: at least one mechanical fastener disposed through the second roofing material and the roof deck.

In some embodiments, the second roofing material further comprises: an adhesive layer.

In some embodiments, the adhesive layer at least partially covers a surface of the first substrate opposite the surface covered by the first membrane layer. In some embodiments, the system further comprises: an adhesive under the first roofing material and the second roofing material.

In some embodiments, the second roofing material further comprises a barrier layer, wherein the barrier layer at least partially covers a surface of the first substrate opposite the surface covered by the first membrane layer.

In some embodiments, the second roofing material further comprises a second substrate, wherein the barrier layer is between the first substrate and the second substrate.

In some embodiments, the system further comprises: at least one mechanical fastener disposed through the second roofing material and the roof deck.

In some embodiments, the second roofing material further comprises an adhesive layer.

In some embodiments, the barrier layer is between the first substrate and the adhesive layer. In some embodiments, the system further comprises an adhesive under the first roofing material and the second roofing material.

In some embodiments, the present invention provides a system, comprising: a roof deck comprising a first portion, and a second portion adjacent the first portion; a first roofing material above the first portion of the roof deck; and a second roofing material above the second portion of the roof deck, adjacent to the first roofing material, wherein the second roofing material comprises: a first membrane layer, wherein the first membrane layer comprises silicone, a first substrate, and a first barrier layer, wherein the first membrane layer covers a surface of the first substrate, and wherein the first substrate partially covers a surface of the first barrier layer, thereby to provide at least a first area of a surface of the first barrier layer not covered by the first substrate, wherein the first roofing material overlaps at least a portion of the first area; and a flashing material, wherein the flashing material comprises silicone, wherein the flashing material is on each of the first roofing material, the first membrane layer of the second roofing material, and the first area of the second roofing material.

In some embodiments, the first area is at a first edge of the second roofing material.

In some embodiments, the first membrane layer partially covers a surface of the first substrate, thereby to provide a second area of the first substrate not covered by the first membrane layer, wherein the second area is at a second edge of the second roofing material.

In some embodiments, the second roofing material further comprises a third membrane layer, wherein the third membrane layer comprises silicone, wherein the third membrane layer at least partially covers a surface of the first substrate opposite the surface covered by the first membrane layer.

In some embodiments, the system further comprises: at least one mechanical fastener disposed through the second roofing material and the roof deck.

In some embodiments, the second roofing material further comprises: an adhesive layer.

In some embodiments, the adhesive layer at least partially covers a surface of the first substrate opposite the surface covered by the first membrane layer.

In some embodiments, the system further comprises: an adhesive under the first roofing material and the second roofing material.

In some embodiments, the second roofing material further comprises a barrier layer, wherein the barrier layer at least partially covers a surface of the first substrate opposite the surface covered by the first membrane layer.

In some embodiments, the second roofing material further comprises a second substrate, wherein the barrier layer is between the first substrate and the second substrate.

In some embodiments, the system further comprises: at least one mechanical fastener disposed through the second roofing material and the roof deck.

In some embodiments, the second roofing material further comprises an adhesive layer.

In some embodiments, the barrier layer is between the first substrate and the adhesive layer.

In some embodiments, the system further comprises an adhesive under the first roofing material and the second roofing material.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION OF THE INVENTION

Figure 1:
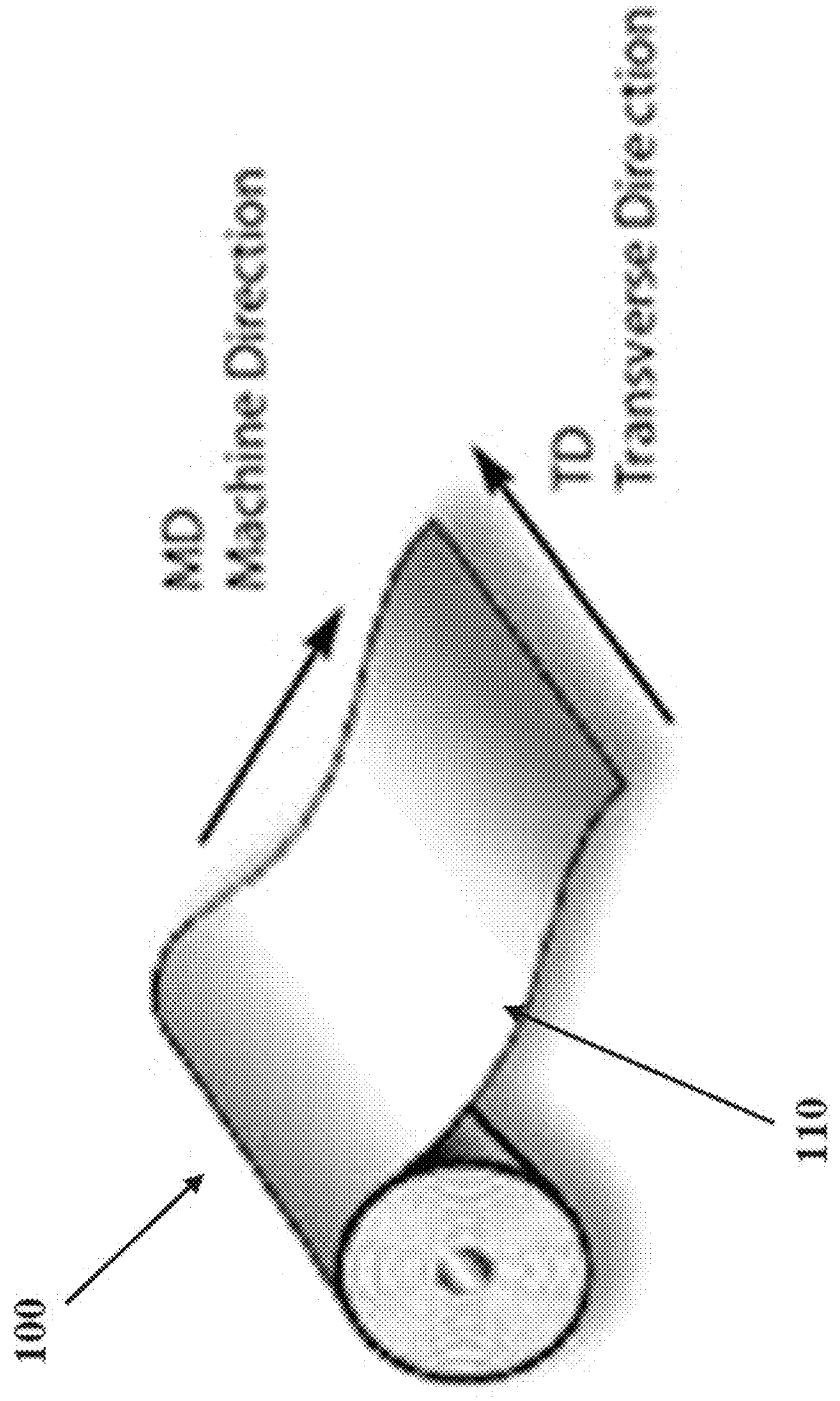
FIG. 1 is an illustration of the machine direction and the transverse direction of a roll of roofing material according to an embodiment of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

As used herein, the term "roofing material" includes, but is not limited to, roofing membranes, including, e.g., a waterproofing membrane, underlayment, and/or a liquid composition or coating.

As used herein, a "steep slope" roof or roof deck is a roof or roof deck having a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck is a roof or roof deck having a pitch greater than zero, but the pitch is less than that of a steep slope roof or roof deck.

As used herein, a "flat" roof or roof deck is a roof or roof deck having a pitch of zero.

In some embodiments, the roofing material may be installed on a roof deck. In some embodiments, the roofing material may be installed directly on the roof deck—that is, with no layer or layers between the roofing material and the roof deck. In some embodiments, the roofing material may be installed indirectly on or above the roof deck—that is, with one or more layers between the roofing material and the roof deck.

In some embodiments, the roof deck may be a steep slope roof deck. In some embodiments, the roof deck may be a sloped roof deck. In some embodiments, the roof deck may be a flat roof deck.

According to some embodiments, the invention relates to roofing materials that comprise hybrid membrane systems having, e.g., a substrate layer, a membrane layer, and an adhesive layer. The hybrid membrane systems allow for flexible roofing installation. Typically, liquid coatings for roofing systems and/or membranes require special spray or rolling equipment, and conventional membranes often suffer from intensive labor that is spent around the details. However, according to some embodiments of the invention, a roofing material system is provided that is comprised of a prefabricated membrane for field installation, a self-adhered substrate (e.g., a scrim) for joint connection, and a flashing for joint sealing that allows for fast installation of the same material over all roofing profiles with maximum flexibility. Thus, according to embodiments described herein, a highly flexible, adaptive roofing system is provided that ensures application of a prefabricated membrane over all roofing profiles and details.

One embodiment of this invention pertains to a roll of roofing material that includes a substrate having a first side and a second side opposite to the first side, a membrane layer attached to the first side of the substrate, and an adhesive layer attached to the second side of the substrate, wherein the substrate is exposed on at least a portion of the first side of the substrate, such that at least the membrane layer does not cover the at least a portion of the first side of the substrate that is exposed.

FIG. 1 illustrates a roll 100 comprising a roofing material 110 according to some embodiments of the invention. In some embodiments, the roll 100 includes a machine direction MD, as shown in FIG. 1, and a transverse direction TD, as also shown in FIG. 1, which is perpendicular to the machine direction MD.

Figure 2:
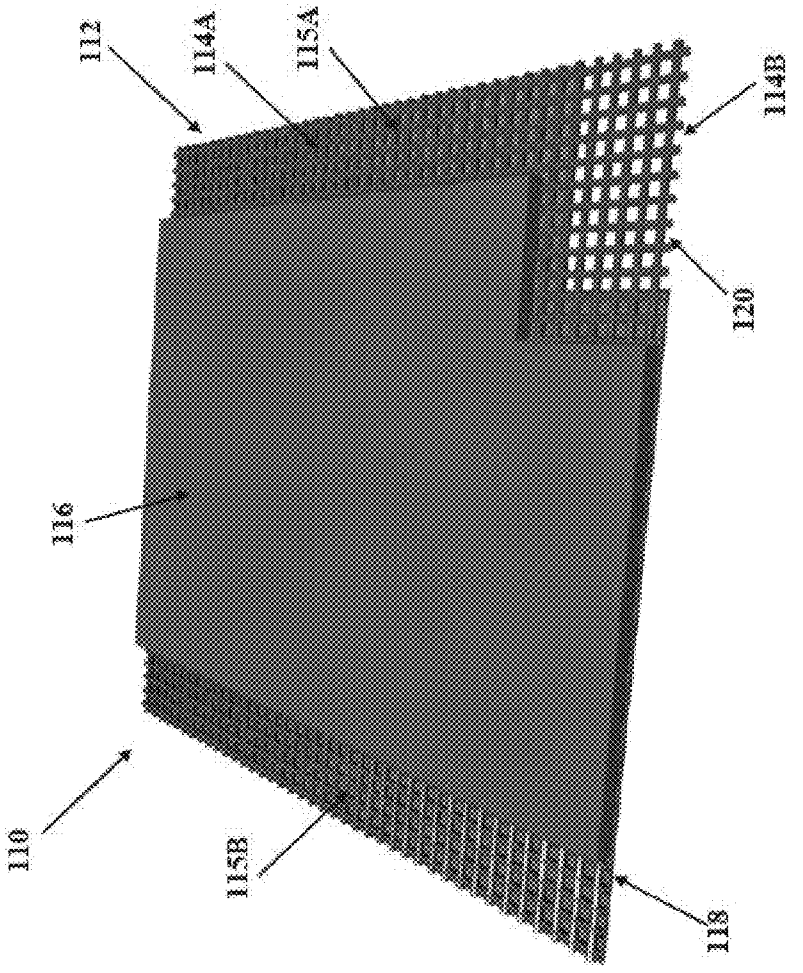
FIG. 2 is an illustration of a roofing material that includes a substrate, a membrane layer, and an adhesive layer according to an embodiment of the invention.

FIG. 2 illustrates the roofing material 110 of FIG. 1, according to some embodiments of the invention. As shown, in some embodiments, the roofing material 110 includes (i) a substrate 112 (e.g., a scrim) having a first side (or top side) 114A and a second side (or bottom side) 114B opposite to the first side 114A, (ii) a membrane layer 116 attached to the first side 114A of the substrate 112, and (iii) an adhesive layer 118 attached to the second side 114B of the substrate 112. In some embodiments, the substrate 112 is exposed on a first area 115A of the first side 114A of the substrate 112, such that the membrane layer 116 does not cover the first area 115A of the first side 114A of the substrate 112 that is exposed. As shown in FIG. 2, in some embodiments, the substrate 112 is also exposed on a second area 115B of the first side 114A of the substrate 112, such that the membrane layer 116 does not cover the second area 115B of the first side 114A of the substrate 112 that is exposed. As further shown in FIG. 2, in some embodiments, the substrate 112 is exposed on at least a portion 120 of the second side 114B of the substrate 112, such that at least the adhesive layer 118 does not cover the portion 120 of the second side 114B of the substrate 112 that is exposed.

Figure 3:
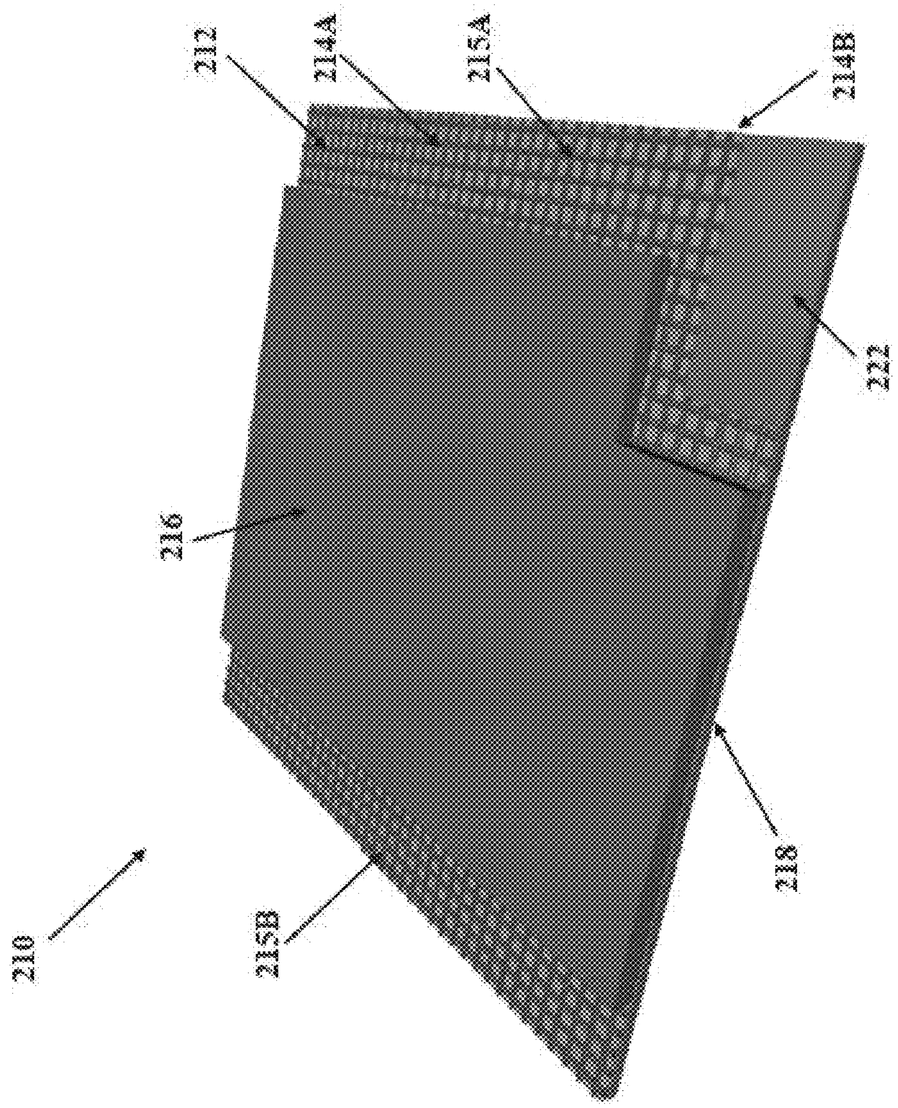
FIG. 3 is an illustration of a roofing material that includes a substrate, a membrane layer, and an adhesive layer according to an embodiment of the invention.

FIG. 3 illustrates a roofing material 210, according to some embodiments of the invention. In some embodiments, as shown, the roofing material 210 includes (i) a substrate 212 (e.g., a scrim) having a first side (or top side) 214A and a second side (or bottom side) 214B opposite to the first side 214A, (ii) a membrane layer 216 attached to the first side 214A of the substrate 212, and (iii) an adhesive layer 218 attached to the second side 214B of the substrate 212. In some embodiments, the substrate 212 is exposed on a first area 215A of the first side 214A of the substrate 212, such that the membrane layer 216 does not cover the first area 215A of the first side 214A of the substrate 212 that is exposed. As shown in FIG. 3, in some embodiments, the substrate 212 is also exposed on a second area 215B of the first side 214A of the substrate 212, such that the membrane layer 216 does not cover the second area 215B of the first side 214A of the substrate 212 that is exposed. As further shown in FIG. 3, in some embodiments, at least a portion 222 of the adhesive layer 218 is exposed, such that at least the substrate 212 does not cover the portion 222 of the adhesive layer 218 that is exposed.

In some embodiments, the substrate 212 comprises at least one of a scrim, a fiberglass mat, or a polyester mat. According to some embodiments, the substrate 212 comprises polyolefin, such as, for example, polyethylene (high density, linear low density, low density, and/or medium density) and/or polypropylene; polyethylene terephthalate (PET); a polyamide; polyvinyl chloride (PVC); polystyrene; polyacrylic; any copolymer, and/or combinations thereof. In some embodiments, the substrate 212 comprises at least one of a woven fabric and/or a non-woven fabric In some embodiments, the membrane layer 216, which can be prefabricated or fabricated in-situ, i.e., fabricated (or cured) after being positioned on the substrate or in the field, comprises a fully cured membrane comprising an elastomer. According to one embodiment, the elastomer comprises silicone, acrylate, polyurethane, or a combination thereof. According to another embodiment, the elastomer comprises a UV-curable resin.

In some embodiments, the membrane layer has a thickness of 5 mils to 100 mils. In some embodiments, the membrane layer has a thickness of 10 mils to 100 mils. In some embodiments, the membrane layer has a thickness of 20 mils to 100 mils. In some embodiments, the membrane layer has a thickness of 30 mils to 100 mils. In some embodiments, the membrane layer has a thickness of 40 mils to 100 mils. In some embodiments, the membrane layer has a thickness of 50 mils to 100 mils. In some embodiments, the membrane layer has a thickness of 60 mils to 100 mils. In some embodiments, the membrane layer has a thickness of 70 mils to 100 mils. In some embodiments, the membrane layer has a thickness of 80 mils to 100 mils. In some embodiments, the membrane layer has a thickness of 90 mils to 100 mils. In some embodiments, the membrane layer has a thickness of 5 mils to 90 mils. In some embodiments, the membrane layer has a thickness of 10 mils to 90 mils. In some embodiments, the membrane layer has a thickness of 20 mils to 90 mils. In some embodiments, the membrane layer has a thickness of 30 mils to 90 mils. In some embodiments, the membrane layer has a thickness of 40 mils to 90 mils. In some embodiments, the membrane layer has a thickness of 50 mils to 90 mils. In some embodiments, the membrane layer has a thickness of 60 mils to 90 mils. In some embodiments, the membrane layer has a thickness of 70 mils to 90 mils. In some embodiments, the membrane layer has a thickness of 80 mils to 90 mils. In some embodiments, the membrane layer has a thickness of 5 mils to 80 mils. In some embodiments, the membrane layer has a thickness of 10 mils to 80 mils. In some embodiments, the membrane layer has a thickness of 20 mils to 80 mils. In some embodiments, the membrane layer has a thickness of 30 mils to 80 mils. In some embodiments, the membrane layer has a thickness of 40 mils to 80 mils. In some embodiments, the membrane layer has a thickness of 60 mils to 80 mils. In some embodiments, the membrane layer has a thickness of 70 mils to 80 mils. In some embodiments, the membrane layer has a thickness of 5 mils to 70 mils. In some embodiments, the membrane layer has a thickness of 10 mils to 70 mils. In some embodiments, the membrane layer has a thickness of 20 mils to 70 mils. In some embodiments, the membrane layer has a thickness of 30 mils to 70 mils. In some embodiments, the membrane layer has a thickness of 40 mils to 70 mils. In some embodiments, the membrane layer has a thickness of 50 mils to 70 mils. In some embodiments, the membrane layer has a thickness of 60 mils to 70 mils. In some embodiments, the membrane layer has a thickness of 5 mils to 60 mils. In some embodiments, the membrane layer has a thickness of 10 mils to 60 mils. In some embodiments, the membrane layer has a thickness of 20 mils to 60 mils. In some embodiments, the membrane layer has a thickness of 30 mils to 60 mils. In some embodiments, the membrane layer has a thickness of 40 mils to 60 mils. In some embodiments, the membrane layer has a thickness of 50 mils to 60 mils. In some embodiments, the membrane layer has a thickness of 5 mils to 50 mils. In some embodiments, the membrane layer has a thickness of 10 mils to 50 mils. In some embodiments, the membrane layer has a thickness of 20 mils to 50 mils. In some embodiments, the membrane layer has a thickness of 30 mils to 50 mils. In some embodiments, the membrane layer has a thickness of 40 mils to 50 mils. In some embodiments, the membrane layer has a thickness of 5 mils to 40 mils. In some embodiments, the membrane layer has a thickness of 10 mils to 40 mils. In some embodiments, the membrane layer has a thickness of 20 mils to 40 mils. In some embodiments, the membrane layer has a thickness of 30 mils to 40 mils. In some embodiments, the membrane layer has a thickness of 5 mils to 30 mils. In some embodiments, the membrane layer has a thickness of 10 mils to 30 mils. In some embodiments, the membrane layer has a thickness of 20 mils to 30 mils. In some embodiments, the membrane layer has a thickness of 5 mils to 20 mils. In some embodiments, the membrane layer has a thickness of 10 mils to 20 mils. In some embodiments, the membrane layer has a thickness of 5 mils to 10 mils.

In some embodiments, the adhesive layer has a thickness of 1 mil to 100 mils. In some embodiments, the adhesive layer has a thickness of 5 mils to 100 mils. In some embodiments, the adhesive layer has a thickness of 10 mils to 100 mils. In some embodiments, the adhesive layer has a thickness of 20 mils to 100 mils. In some embodiments, the adhesive layer has a thickness of 30 mils to 100 mils. In some embodiments, the adhesive layer has a thickness of 40 mils to 100 mils. In some embodiments, the adhesive layer has a thickness of 50 mils to 100 mils. In some embodiments, the adhesive layer has a thickness of 60 mils to 100 mils. In some embodiments, the adhesive layer has a thickness of 70 mils to 100 mils. In some embodiments, the adhesive layer has a thickness of 80 mils to 100 mils. In some embodiments, the adhesive layer has a thickness of 90 mils to 100 mils. In some embodiments, the adhesive layer has a thickness of 1 mil to 90 mils. In some embodiments, the adhesive layer has a thickness of 5 mils to 90 mils. In some embodiments, the adhesive layer has a thickness of 10 mils to 90 mils. In some embodiments, the adhesive layer has a thickness of 20 mils to 90 mils. In some embodiments, the adhesive layer has a thickness of 30 mils to 90 mils. In some embodiments, the adhesive layer has a thickness of 40 mils to 90 mils. In some embodiments, the adhesive layer has a thickness of 50 mils to 90 mils. In some embodiments, the adhesive layer has a thickness of 60 mils to 90 mils. In some embodiments, the adhesive layer has a thickness of 70 mils to 90 mils. In some embodiments, the adhesive layer has a thickness of 80 mils to 90 mils. In some embodiments, the adhesive layer has a thickness of 1 mil to 80 mils. In some embodiments, the adhesive layer has a thickness of 5 mils to 80 mils. In some embodiments, the adhesive layer has a thickness of 10 mils to 80 mils. In some embodiments, the adhesive layer has a thickness of 20 mils to 80 mils. In some embodiments, the adhesive layer has a thickness of 30 mils to 80 mils. In some embodiments, the adhesive layer has a thickness of 40 mils to 80 mils. In some embodiments, the adhesive layer has a thickness of 50 mils to 80 mils. In some embodiments, the adhesive layer has a thickness of 60 mils to 80 mils. In some embodiments, the adhesive layer has a thickness of 70 mils to 80 mils. In some embodiments, the adhesive layer has a thickness of 1 mil to 70 mils. In some embodiments, the adhesive layer has a thickness of 5 mils to 70 mils. In some embodiments, the adhesive layer has a thickness of 10 mils to 70 mils. In some embodiments, the adhesive layer has a thickness of 30 mils to 70 mils. In some embodiments, the adhesive layer has a thickness of 40 mils to 70 mils. In some embodiments, the adhesive layer has a thickness of 50 mils to 70 mils. In some embodiments, the adhesive layer has a thickness of 60 mils to 70 mils. In some embodiments, the adhesive layer has a thickness of 1 mil to 60 mils. In some embodiments, the adhesive layer has a thickness of 5 mils to 60 mils. In some embodiments, the adhesive layer has a thickness of 10 mils to 60 mils. In some embodiments, the adhesive layer has a thickness of 20 mils to 60 mils. In some embodiments, the adhesive layer has a thickness of 30 mils to 60 mils. In some embodiments, the adhesive layer has a thickness of 40 mils to 60 mils. In some embodiments, the adhesive layer has a thickness of 50 mils to 60 mils. In some embodiments, the adhesive layer has a thickness of 1 mil to 50 mils. In some embodiments, the adhesive layer has a thickness of 5 mils to 50 mils. In some embodiments, the adhesive layer has a thickness of 10 mils to 50 mils. In some embodiments, the adhesive layer has a thickness of 20 mils to 50 mils. In some embodiments, the adhesive layer has a thickness of 30 mils to 50 mils. In some embodiments, the adhesive layer has a thickness of 40 mils to 50 mils. In some embodiments, the adhesive layer has a thickness of 1 mil to 40 mils. In some embodiments, the adhesive layer has a thickness of 5 mils to 40 mils. In some embodiments, the adhesive layer has a thickness of 10 mils to 40 mils. In some embodiments, the adhesive layer has a thickness of 20 mils to 40 mils. In some embodiments, the adhesive layer has a thickness of 30 mils to 40 mils. In some embodiments, the adhesive layer has a thickness of 1 mil to 30 mils. In some embodiments, the adhesive layer has a thickness of 5 mils to 30 mils. In some embodiments, the adhesive layer has a thickness of 10 mils to 30 mils. In some embodiments, the adhesive layer has a thickness of 20 mils to 30 mils. In some embodiments, the adhesive layer has a thickness of 1 mil to 20 mils. In some embodiments, the adhesive layer has a thickness of 5 mils to 20 mils. In some embodiments, the adhesive layer has a thickness of 10 mils to 20 mils. In some embodiments, the adhesive layer has a thickness of 1 mil to 10 mils. In some embodiments, the adhesive layer has a thickness of 5 mils to 10 mils. In some embodiments, the adhesive layer has a thickness of 1 mil to 5 mils.

In some embodiments, a roofing system includes (a) a roof deck, (b) a first roofing material applied onto the roof deck, the first roofing material including (i) a substrate having a first side and a second side opposite to the first side, (ii) a membrane layer attached to the first side of the substrate, and (iii) an adhesive layer attached to the second side of the substrate, wherein the substrate is exposed on at least a portion of the first side of the substrate, such that at least the membrane layer does not cover the at least a portion of the first side of the substrate that is exposed, and (c) a second roofing material applied onto the roof deck, the second roofing material including (i) a substrate having a first side and a second side opposite to the first side, (ii) a membrane layer attached to the first side of the substrate, and (iii) an adhesive layer attached to the second side of the substrate.

Figure 4:
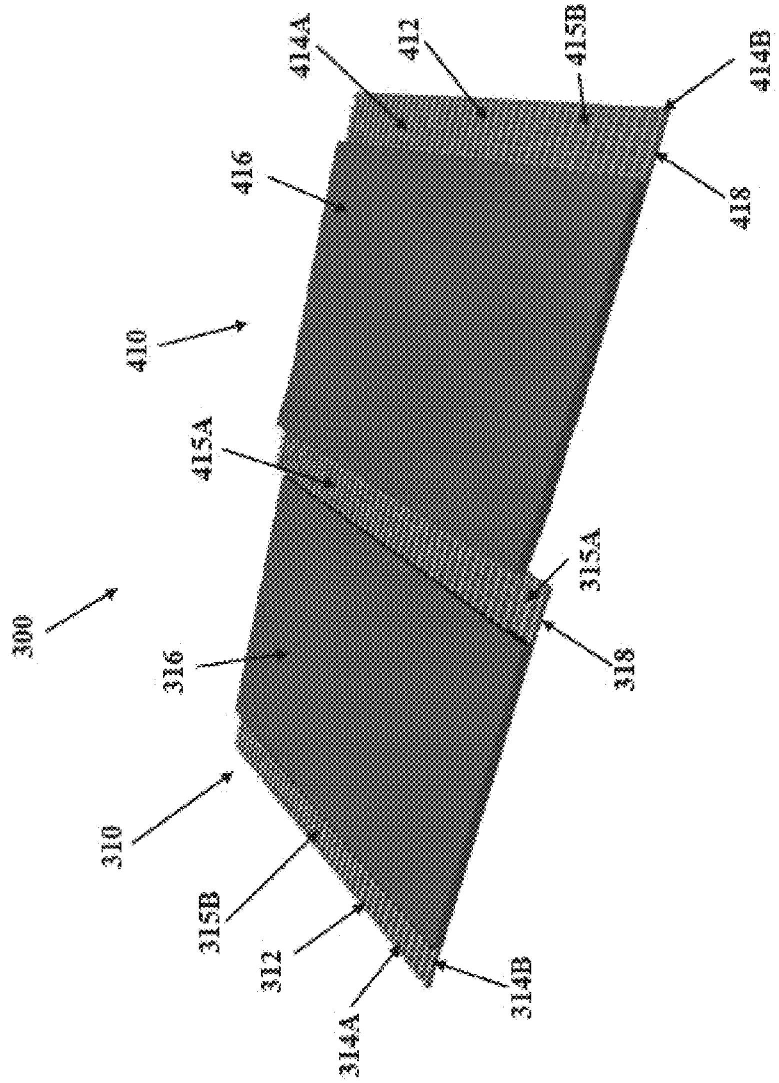
FIG. 4 is an illustration of a roofing system that includes a first roofing material and a second roofing material that at least partially overlaps the first roofing material according to an embodiment of the invention.

FIG. 4 illustrates a roofing system 300 according to some embodiments of the invention. In some embodiments, the roofing system 300 includes a roof deck (not shown), a first roofing material 310 applied onto the roof deck, the first roofing material 310 including (i) a substrate 312 having a first side 314A and a second side 314B opposite to the first side 314A, (ii) a membrane layer 316 attached to the first side 314A of the substrate 312, and (iii) an adhesive layer 318 attached to the second side 314B of the substrate 312. The roofing system 300 further includes a second roofing material 410 applied onto the roof deck (not shown). The second roofing material 410 includes (i) a substrate 412 having a first side 414A and a second side 414B opposite to the first side 414A, (ii) a membrane layer 416 attached to the first side 414A of the substrate 412, and (iii) an adhesive layer 418 attached to the second side 414B of the substrate 412.

As shown in FIG. 4, the substrate 312 of the first roofing material 310 is exposed on a first area 315A of the first side 314A of the substrate 312, such that at least the membrane layer 316 does not cover the first area 315A of the first side 314A of the substrate 312 that is exposed. As shown in FIG. 4, the substrate 312 of the first roofing material 310 is also exposed on a second area 315B of the first side 314A of the substrate 312, such that the membrane layer 316 does not cover the second area 315B of the first side 314A of the substrate 312 that is exposed. In the embodiment of FIG. 4, the second roofing material 410 at least partially overlaps the substrate 312 of the first roofing material 310 that is exposed.

As also shown in FIG. 4, the substrate 412 of the second roofing material 410 is exposed on a first area 415A of the first side 414A of the substrate 412 of the second roofing material 410, such that at least the membrane layer 416 of the second roofing material 410 does not cover the first area 415A of the first side 414A of the substrate 412 of the second roofing material 410 that is exposed. According to the embodiment of FIG. 4, the first area 415A of the first side 414A of the substrate 412 of the second roofing material 410 that is exposed at least partially overlaps the first roofing material 310 along the first area 315A of the first side 314A of the substrate 312 of the first roofing material 310 that is exposed. Additionally, as shown in FIG. 4, the substrate 412 of the second roofing material 410 is also exposed on a second area 415B of the first side 414A of the substrate 412, such that the membrane layer 416 does not cover the second area 415B of the first side 414A of the substrate 412 that is exposed.

Figure 5:
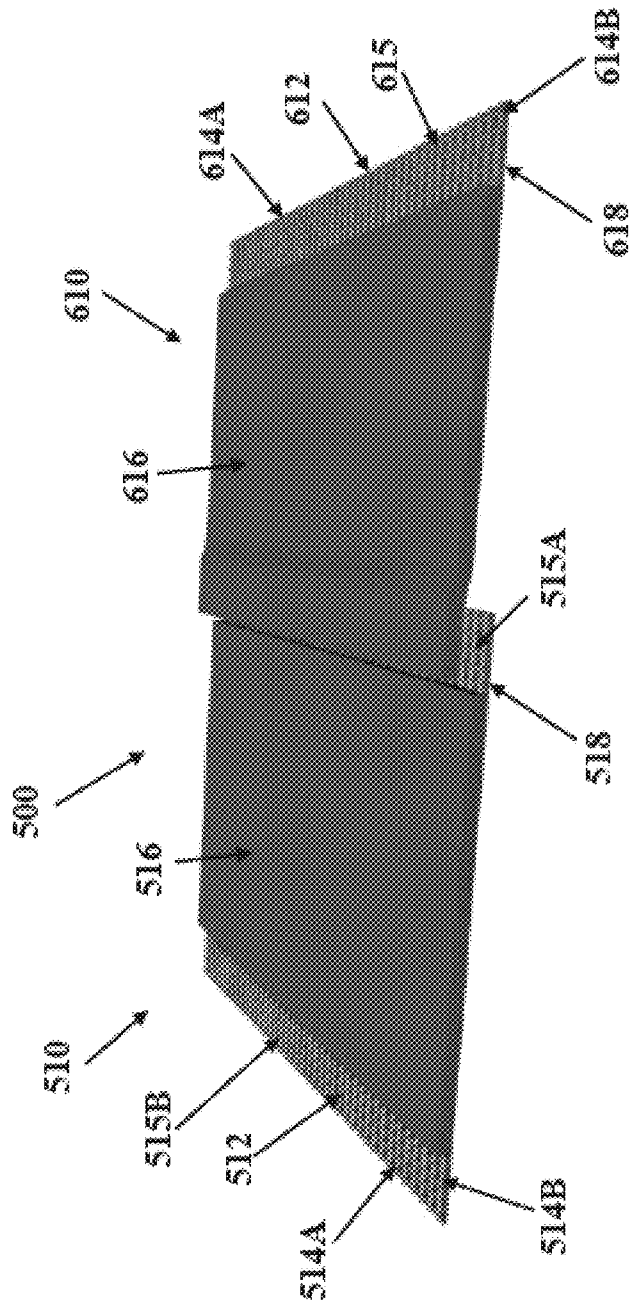
FIG. 5 is an illustration of a roofing system that includes a first roofing material and a second roofing material that at least partially overlaps the first roofing material according to an embodiment of the invention.

FIG. 5 illustrates a roofing system 500 according to some embodiments of the invention. In some embodiments, the roofing system 500 includes a roof deck (not shown), a first roofing material 510 applied onto the roof deck, the first roofing material 510 including (i) a substrate 512 having a first side 514A and a second side 514B opposite to the first side 514A, (ii) a membrane layer 516 attached to the first side 514A if the substrate 512, and (iii) an adhesive layer 518 attached to the second side 514B of the substrate 512. The roofing system 500 further includes a second roofing material 610 applied onto the roof deck (not shown). The second roofing material 610 includes (i) a substrate 612 having a first side 614A and a second side 614B opposite to the first side 614A, (ii) a membrane layer 616 attached to the first side 614A of the substrate 612, and (iii) an adhesive layer 618 attached to the second side 614B of the substrate 612.

As shown in FIG. 5, the substrate 512 of the first roofing material 510 is exposed on a first area 515A of the first side 514A of the substrate 512, such that at least the membrane layer 516 does not cover the first area 515A of the first side 514A of the substrate 512 that is exposed. As shown in FIG. 5, the substrate 512 of the first roofing material 510 is also exposed on a second area 515B of the first side 514A of the substrate 512, such that the membrane layer 516 does not cover the second area 515B of the first side 514A of the substrate 512 that is exposed. In the embodiment of FIG. 5, the second roofing material 610 at least partially overlaps the first roofing material 510 along the first area 515A of the first side 514A of the substrate 512 of the first roofing material 510 that is exposed. As also shown in FIG. 5, the substrate 612 of the second roofing material 610 is exposed on a portion 615 of the first side 614A of the substrate 612 of the second roofing material 610, such that at least the membrane layer 616 of the second roofing material 610 does not cover the portion 615 of the first side 614A of the substrate 612 of the second roofing material 610 that is exposed.

Figure 6A:
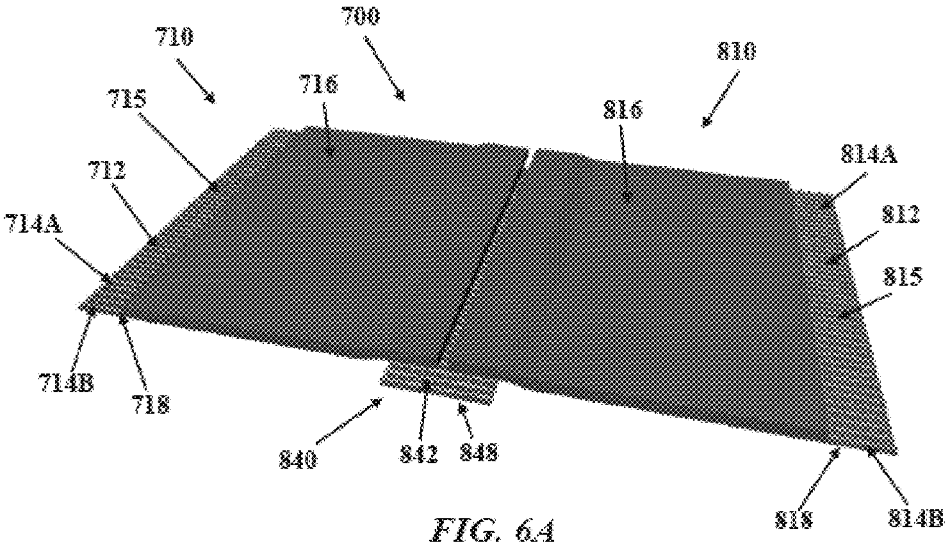
FIGS. 6A and 6B are illustrations of a roofing system that includes a first roofing material and a second roofing material according to an embodiment of the invention.
Figure 6B:
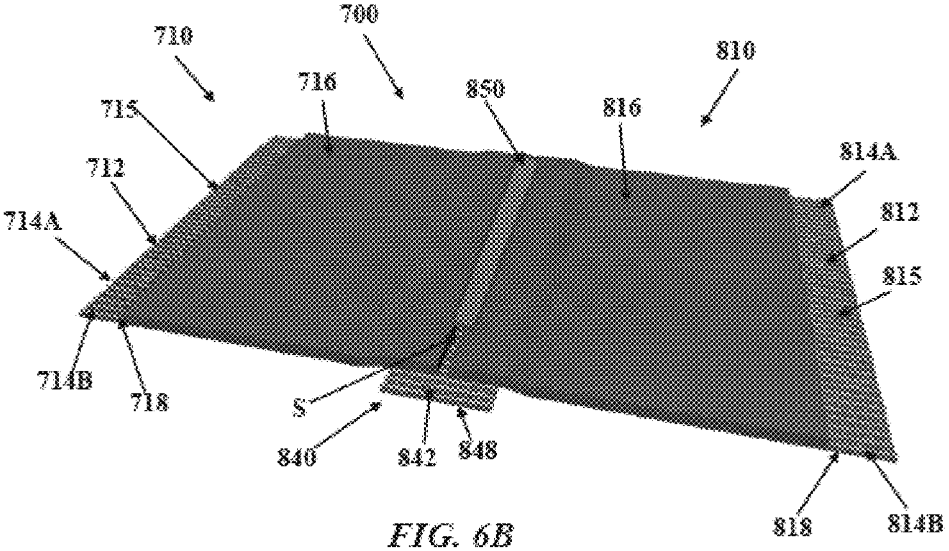

FIGS. 6A and 6B illustrate a roofing system 700 according to some embodiments of the invention. In some embodiments, the roofing system 700 includes a roof deck (not shown), a first roofing material 710 applied onto the roof deck, the first roofing material 710 including (i) a substrate 712 having a first side 714A and a second side 714B opposite to the first side 714A, (ii) a membrane layer 716 attached to the first side 714A of the substrate 712, and (iii) an adhesive layer 718 attached to the second side 214B of the substrate 712. The roofing system 700 further includes a second roofing material 810 applied onto the roof deck (not shown). The second roofing material 810 includes (i) a substrate 812 having a first side 814A and a second side 814B opposite to the first side 814A, (ii) a membrane layer 816 attached to the first side 814A of the substrate 812, and (iii) an adhesive layer 818 attached to the second side 814B of the substrate 812.

As shown in the embodiment of FIGS. 6A and 6B, the substrate 712 of the first roofing material 710 is exposed on a portion 715 of the first side 714A of the substrate 712, such that at least the membrane layer 716 does not cover the portion 715 of the first side 714A of the substrate 712 that is exposed. As also shown in the embodiment of FIGS. 6A and 6B, the substrate 812 of the second roofing material 810 is exposed on a portion 815 of the first side 814A of the substrate 812 of the second roofing material 810, such that at least the membrane layer 816 of the second roofing material 810 does not cover the portion 815 of the first side 814A of the substrate 812 of the second roofing material 810 that is exposed.

As further shown in the embodiment of FIGS. 6A and 6B, the second roofing material 810 is applied adjacent to the first roofing material 710 with a separate mesh strip 840 connecting the first roofing material 710 to the second roofing material 810. The separate mesh strip 840 of FIGS. 6A and 6B can further include a substrate 842 (e.g., a scrim or mesh) that is attached to an adhesive layer 848. As further shown in the embodiment of FIGS. 6A and 6B, the adhesive layer 718 of the first roofing material 710 overlaps the separate mesh strip 840 and the adhesive layer 818 of the second roofing material 810 overlaps the separate mesh strip 840.

According to the embodiment shown in FIG. 6B, the roofing system 700 further comprises a flashing grade membrane 850 applied along a space S (or any spaces) between the first roofing material 710 and the second roofing material 810. According to an embodiment, the flashing grade membrane 850 comprises a fluid flashing material that is applied along the space S between the first roofing material 710 and the second roofing material 810 and thereafter cured.

According to one embodiment, the fluid flashing material is a viscous material, including, e.g., a UV-curable resin. According to another embodiment, the fluid flashing material is a liquid (e.g., a liquid silicone coating) that can be applied in situ (e.g., in the field) when installing the roofing material.

Some embodiments provide a method of installing a roofing material onto a roofing surface. The method includes (a) obtaining a first roofing material comprising (i) a substrate having a first side and a second side opposite to the first side, (ii) a membrane layer attached to the first side of the substrate, and (iii) an adhesive layer attached to the second side of the substrate, wherein the substrate is exposed on at least a portion of the first side of the substrate, such that at least the membrane layer does not cover the at least a portion of the first side of the substrate that is exposed, (b) obtaining a second roofing material comprising (i) a substrate having a first side and a second side opposite to the first side, (ii) a membrane layer attached to the first side of the substrate, and (iii) an adhesive layer attached to the second side of the substrate, (c) applying the first roofing material to a roof deck, and (d) applying the second roofing material to the roof deck In some embodiments, the method further includes applying a separate mesh strip between the first roofing material and the second roofing material, such that (i) the adhesive layer of the first roofing material overlaps the separate mesh strip and (ii) the adhesive layer of the second roofing material overlaps the separate mesh strip (see, e.g., FIG. 6A).

In some embodiments, the method further includes applying a fluid flashing material along any spaces between the first roofing material and the second roofing material to fill any spaces between the first roofing material and the second roofing material by curing the fluid flashing material into a flashing grade membrane (see, e.g., FIG. 6B). According to an embodiment, the applying a fluid flashing material along any spaces between the first roofing material and the second roofing material includes spreading the fluid flashing material on each side of the first roofing material and the second roofing material to create waterproof seals. According to another embodiment, the spreading of the fluid flashing material on each side of the first roofing material and the second roofing material is conducted by spreading the fluid flashing material from 1 inch to 4 inches on each side of the first roofing material and the second roofing material to create the waterproof seals.

According to an embodiment, the applying of a fluid flashing material along any spaces between the first roofing material and the second roofing material to fill any spaces between the first roofing material and the second roofing material, by curing the fluid flashing material into a flashing grade membrane (see, e.g., FIG. 6B), allows for the creation of a monolithic membrane structure (i.e., a structure with no steps and/or discontinuities), while also sealing any seams between the roofing materials, to provide a superior waterproofing membrane structure.

According to the embodiments of FIGS. 4, 5, 6A and 6B, described above, when applied in the field, there are several ways adjacent membranes may be joined, depending on whether either or both of the membranes need to be cut to fit the area. For example, according to the embodiment of FIG. 4 described above, when both membranes (i.e., membrane layer 316 of the first roofing material 310 and membrane layer 416 of the second roofing material 410) have an extended substrate (e.g., a scrim or mesh) (i.e., first area 315A) of substrate 312 of the first roofing material 310 and first area 415A of substrate 412 of second roofing material 410), the roofing materials 310 and 410 will overlap and reside on each other. However, in the embodiment of FIG. 5 described above, the second roofing material 610 was cut and has no extended substrate (e.g., scrim or mesh) 612 on one side. Thus, in the embodiment of FIG. 5, the first roofing material 510 with the extended substrate (e.g., a scrim or mesh) (i.e., first area 515A) of substrate 512 of the first roofing material 510) will lay on the bottom and the second roofing material 610 resides on top, such that the adhesive layer 618 of the second roofing material 610 will stick to the top surface of the extended substrate of the first roofing material 510 (i.e., first area 515A) of substrate 512 of the first roofing material 510). In yet another embodiment, as discussed above with respect to the embodiment of FIGS. 6A and 6B, both membranes 716, 816 or roofing materials 710, 810 were cut and thus have no extended substrate (e.g., a scrim or mesh) 712, 812 on one side. In some embodiments, a separate strip of back adhered mesh (i.e., separate mesh strip 840 having a substrate (e.g., a scrim or mesh) that is attached to an adhesive layer) was applied onto the bottom and both membranes 716, 816 have their edges residing on this mesh strip (i.e., separate mesh strip 840) with their back adhesive layers 718, 818 stuck to this mesh strip (i.e., separate mesh strip 840). As discussed above with respect to the embodiment of FIG. 6B, a flashing grade membrane 850 can be filled into the space(s) S between the neighboring membranes 716, 816 and spread, for example, 1 inch to 4 inches, on each side to create waterproof seals.

Figure 7C:
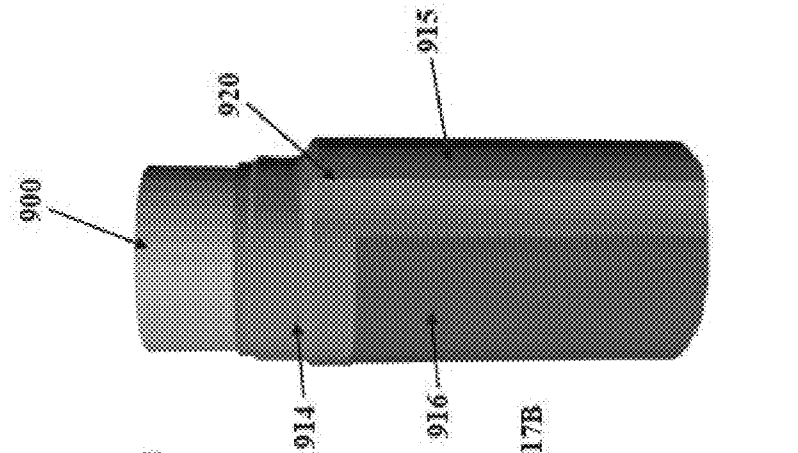
FIGS. 7A-7C are illustrations of a membrane for pipe treatment according to an embodiment of the invention.
Figure 7B:
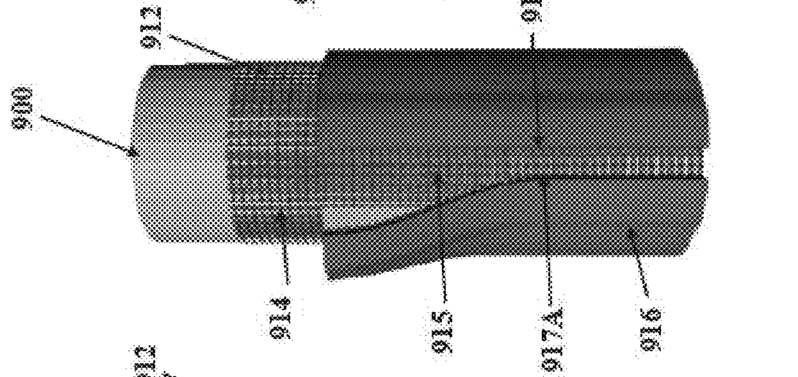
Figure 7A:
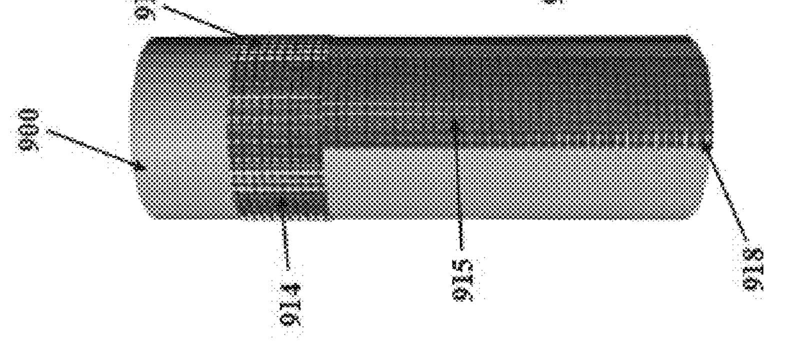

A similar approach to the above can be applied to other features or details including, e.g., seams, vertical joints, edges, and penetration profiles. For example, the same or a similar field membrane structure, as described above can be used for pipe treatment. FIGS. 7A-7C illustrate a membrane structure for pipe treatment according to an embodiment of the invention. According to some embodiments, as shown in, e.g., FIG. 7A, a first step of wrapping a substrate 912 (e.g., a scrim or mesh) with a back adhesive layer 918 around a pipe 900 is conducted. According to one embodiment, a complete wrap of the substrate with the back adhesive layer around the pipe can be used to cover the entire pipe circumference, for example, for 4 inches to 12 inches from the bottom of the pipe. In another embodiment, as shown in, e.g., FIG. 7A, the substrate 912 with the back adhesive layer 918 can be applied only at the top flashing area 914 plus a vertical strip 915 at the expect joint of membrane. In yet another embodiment, and in certain cases when the flashing has sufficient adhesion to the pipe material, the expect joint seam can be less than ¼ inch, so that it can be safely sealed by flashing without reinforcement and thus, a step of wrapping with a substrate (e.g., a scrim or mesh) can be skipped.

According to some embodiments, after the first step of wrapping a substrate 912 (e.g., a scrim or mesh) with a back adhesive layer 918 around a pipe 900 (e.g., FIG. 7A), a second step of cutting a piece of field membrane 916 is conducted to wrap the membrane 916 around the pipe 900, as shown in, e.g., FIG. 7B, with two ends 917A, 917B of the membrane 916 meeting at a vertical strip 915 as described above. In a third step, as shown in, e.g., FIG. 7C, flashing 920 is used at the top flashing area 914 and seam 915 using flashing grade to finish sealing the pipe 900.

Figure 8:
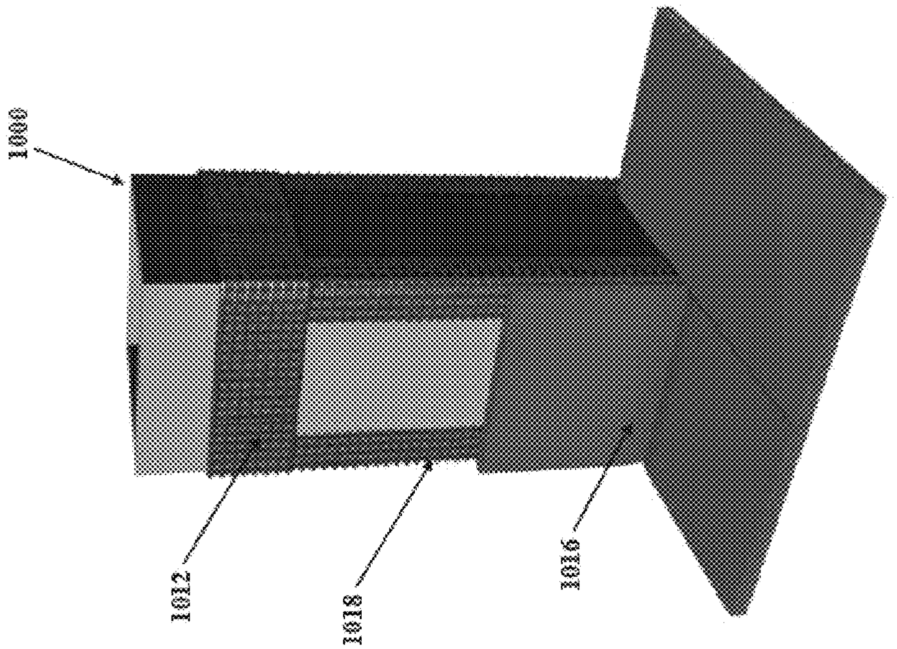
FIG. 8 is an illustration of a membrane for joint or penetration treatment according to an embodiment of the invention.

In some embodiments, joint or penetration treatment can be constructed or partially constructed by extending and bending the field membrane structure. For example, FIG. 8 is an illustration of a membrane structure for joint or penetration treatment according to an embodiment of the invention. As shown in FIG. 8, a substrate 1012 (e.g., a scrim or mesh) with a back adhesive layer 1018 is cut, depending on the shape and size of the joint or penetration 1000, and wrapped around the joint or penetration 1000. As further shown in FIG. 8, a piece of field membrane 1016 is cut and the membrane 1016 is bent and/or wrapped around the joint or penetration 1000 in any orientation needed to treat the joint or penetration 1000. According to an embodiment, any seam between neighboring membranes can be filled by flashing grade membranes (not shown).

According to some embodiments of the invention described herein, roofing systems are provided that include (i) a roofing membrane with an embedded substrate (e.g., a scrim(s) or mesh) and back adhesive layer for both field application and wrapping around details (see, e.g., FIGS. 2-5), (ii) a substrate (e.g., a scrim or mesh) with a back adhesive layer to connect joints between adjacent membranes, such that the substrate (e.g., scrim) is able to absorb or accept flashing grade membrane (see, e.g., FIGS. 6A and 6B), and/or (iii) a flashing grade membrane applied to a substrate (e.g., a scrim(s) or mesh) to seal any opening joints (see, e.g., FIG. 6B), with the flashing grade membrane having greater than 2 PLI wet adhesion on both the substrate (e.g., scrim) surface and the membrane surface.

FIGS. 9-20 show schematic cross-sectional views of roofing materials, in accordance with some embodiments of the invention. Any of these roofing materials may be installed on and/or above areas of the roof deck, as described above and as further described. Any of these roofing materials may be in the form of a roll, as described.

Figure 9:
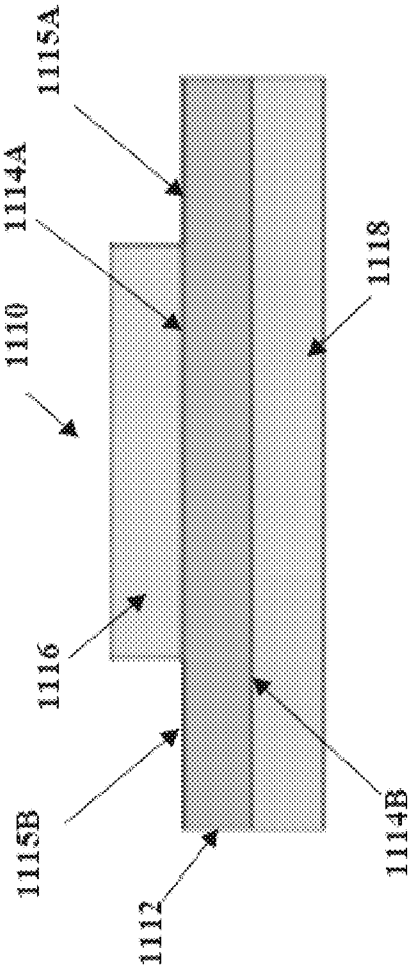
FIG. 9 is a schematic cross-sectional view of a roofing material, in accordance with some embodiments of the invention.

With reference to FIG. 9, in some embodiments, the roofing material 1110 includes (i) a substrate 1112 (e.g., a scrim) having a first side (or top side) 1114A and a second side (or bottom side) 1114B opposite to the first side 1114A, (ii) a first membrane layer 1116 attached to the first side 1114A of the substrate 1112, and (iii) a second membrane layer 1118 attached to the second side 1114B of the substrate 1112. In some embodiments, the substrate 1112 is exposed on a first area 1115A of the first side 1114A of the substrate 1112, such that the first membrane layer 1116 does not cover the first area 1115A of the first side 1114A of the substrate 1112 which is exposed. As shown, in some embodiments, the substrate 1112 is also exposed on a second area 1115B of the first side 1114A of the substrate 1112, such that the first membrane layer 1116 does not cover the second area 1115B of the first side 1114A of the substrate 1112 that is exposed. In some embodiments, one or more of the substrate 1112, the first membrane layer 1116, and/or the second membrane layer 1118 may be in accordance with the substrate and/or membrane layer described above.

As discussed, in some embodiments, the roofing material 1110 is installed on or above a first portion of a roof deck, and a second roofing material is installed above a second portion of the roof deck which is adjacent the first portion, such that the second roofing material and the roofing material 1110 overlap. In some embodiments, the roofing material 1110 and/or the second roofing material are fastened mechanically to the roof deck, such as, for example, by staples, nails, screws, rivets, or other mechanical fasteners disposed through and penetrating the roofing material 1110 and the roof deck. In some embodiments, the second roofing material overlaps at least a portion of the first area 1115A of the roofing material 1110. In some embodiments, the flashing grade membrane, such as the fluid flashing material, is applied on the roofing material 1110 and the second roofing material, such that the flashing grade membrane covers at least a portion of the first membrane layer 1116, the second roofing material, and/or the first area 1115A of the substrate 1112. In some embodiments, the flashing grade membrane is cured thereafter. In some embodiments, the flashing grade membrane and/or the fluid flashing material may be as described above.

In some embodiments, a third roofing material is installed above a third portion of the roof deck which is adjacent the first portion, such that the third roofing material and the roofing material 1110 overlap. In some embodiments, the third roofing material is fastened mechanically to the roof deck. In some embodiments, the third roofing material overlaps at least a portion of the second area 1115B of the roofing material 1110. In some embodiments, the flashing grade membrane, such as the fluid flashing material, is applied on the roofing material 1110 and the third roofing material, such that the flashing grade membrane covers at least a portion of the first membrane layer 1116, the third roofing material, and/or the second area 1115B of the substrate 1112. In some embodiments, the flashing grade membrane is cured thereafter. In some embodiments, the flashing grade membrane and/or the fluid flashing material may be as described above.

Figure 10:
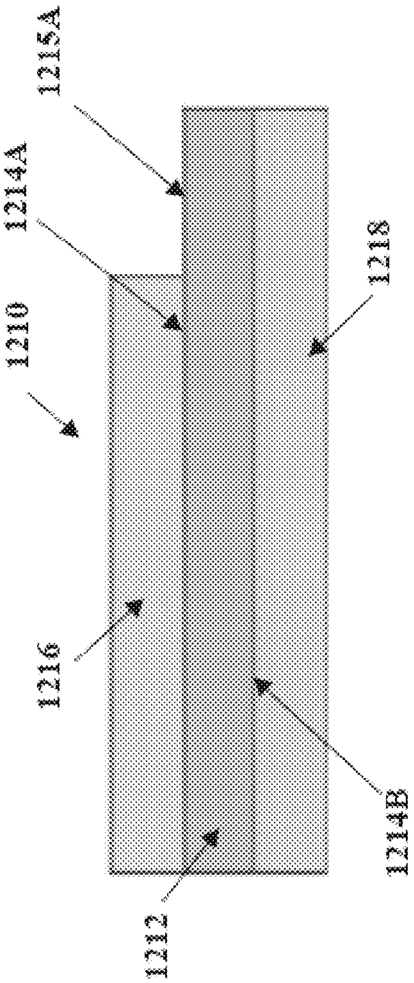
FIG. 10 is a schematic cross-sectional view of a roofing material, in accordance with some embodiments of the invention.

With reference to FIG. 10, in some embodiments, the roofing material 1210 includes (i) a substrate 1212 (e.g., a scrim) having a first side (or top side) 1214A and a second side (or bottom side) 1214B opposite to the first side 1214A, (ii) a first membrane layer 1216 attached to the first side 1214A of the substrate 1212, and (iii) a second membrane layer 1218 attached to the second side 1214B of the substrate 1212. In some embodiments, the substrate 1212 is exposed on a first area 1215A of the first side 1214A of the substrate 1212, such that the first membrane layer 1216 does not cover the first area 1215A of the first side 1214A of the substrate 1212 that is exposed. In some embodiments, one or more of the substrate 1212, the first membrane layer 1216, and/or the second membrane layer 1218 may be in accordance with the substrate and/or membrane layer described above.

As discussed, in some embodiments, the roofing material 1210 is installed above a first portion of a roof deck, and a second roofing material is installed above a second portion of the roof deck which is adjacent the first portion. In some embodiments, the second roofing material and the roofing material 1210 overlap. In some embodiments, either or both of the roofing material 1210 and the second roofing material are fastened mechanically to the roof deck. In some embodiments, the second roofing material overlaps at least a portion of the first area 1215A of the roofing material 1210. In some embodiments, the flashing grade membrane, such as the fluid flashing material, is applied on the roofing material 1210 and the second roofing material, such that the flashing grade membrane covers at least a portion of the first membrane layer 1216, the second roofing material, and/or the first area 1215A of the substrate 1212. In some embodiments, the flashing grade membrane is cured thereafter. In some embodiments, the flashing grade membrane and/or the fluid flashing material may be as described above.

Figure 11:
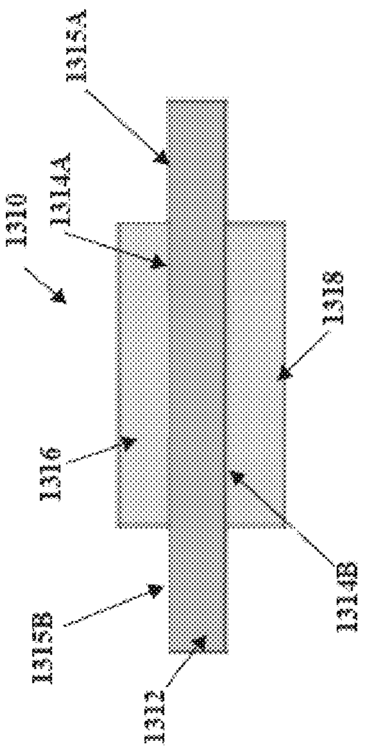
FIG. 11 is a schematic cross-sectional view of a roofing material, in accordance with some embodiments of the invention.

With reference to FIG. 11, in some embodiments, the roofing material 1310 includes (i) a substrate 1312 (e.g., a scrim) having a first side (or top side) 1314A and a second side (or bottom side) 1314B opposite to the first side 1314A, (ii) a first membrane layer 1316 attached to the first side 1314A of the substrate 1312, and (iii) a second membrane layer 1318 attached to the second side 1314B of the substrate 1312. In some embodiments, the substrate 1312 is exposed on a first area 1315A of the first side 1314A and the second side 1314B of the substrate 1312, such that the first membrane layer 1316 and the second membrane layer 1318 do not cover the first area 1315A of the substrate 1312 which is exposed. In some embodiments, the substrate 1312 is exposed on a second area 1315B of the first side 1314A and the second side 1314B of the substrate 1312, such that the first membrane layer 1316 and the second membrane layer 1318 do not cover the second area 1315B of the substrate 1312 which is exposed. In some embodiments, one or more of the substrate 1312, the first membrane layer 1316, and/or the second membrane layer 1318 may be in accordance with the substrate and/or membrane layer described above.

As discussed, in some embodiments, the roofing material 1310 is installed above a first portion of a roof deck, and a second roofing material is installed above a second portion of the roof deck which is adjacent the first portion. In some embodiments, the second roofing material and the roofing material 1310 overlap. In some embodiments, the roofing material 1310 and/or the second roofing material are fastened mechanically to the roof deck. In some embodiments, the second roofing material overlaps the first area 1315A of the roofing material 1310. In some embodiments, the first area 1315A of the roofing material 1310 overlaps the second roofing material. In some embodiments, the flashing grade membrane, such as the fluid flashing material, is applied on the roofing material 1310 and the second roofing material, such that the flashing grade membrane covers at least a portion of the first membrane layer 1316, the second roofing material, and/or the first area 1315A of the substrate 1312. In some embodiments, the flashing grade membrane is cured thereafter. In some embodiments, the flashing grade membrane and/or the fluid flashing material may be as described above.

As discussed, in some embodiments, third roofing material is installed above a third portion of the roof deck which is adjacent the first portion of the roof deck, such that the third roofing material and the roofing material 1310 overlap. In some embodiments, the third roofing material is fastened mechanically to the roof deck. In some embodiments, the third roofing material overlaps the second area 1315B of the roofing material 1310. In some embodiments, the second area 1315B of the roofing material 1310 overlaps the third roofing material. In some embodiments, the flashing grade membrane, such as the fluid flashing material, is applied on the roofing material 1310 and the third roofing material, such that the flashing grade membrane covers at least a portion of the first membrane layer 1316, the third roofing material, and/or the second area 1315B of the substrate 1312. In some embodiments, the flashing grade membrane is cured thereafter. In some embodiments, the flashing grade membrane and/or the fluid flashing material may be as described above.

Figure 12:
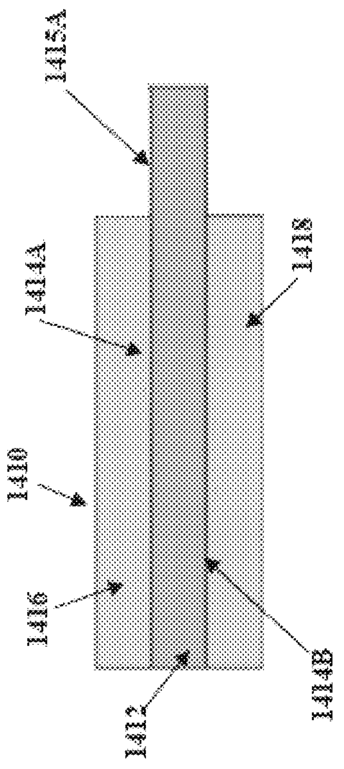
FIG. 12 is a schematic cross-sectional view of a roofing material, in accordance with some embodiments of the invention.

With reference to FIG. 12, in some embodiments, the roofing material 1410 includes (i) a substrate 1412 (e.g., a scrim) having a first side (or top side) 1414A and a second side (or bottom side) 1414B opposite to the first side 1414A, (ii) a first membrane layer 1416 attached to the first side 1414A of the substrate 1412, and (iii) a second membrane layer 1418 attached to the second side 1414B of the substrate 1412. In some embodiments, the substrate 1412 is exposed on a first area 1415A of the first side 1414A and the second side 1414B of the substrate 1412, such that the first membrane layer 1416 and the second membrane layer 1418 do not cover the first area 1415A of the substrate 1412 which is exposed. In some embodiments, one or more of the substrate 1412, the first membrane layer 1416, and/or the second membrane layer 1418 may be in accordance with the substrate As discussed, in some embodiments, the roofing material 1410 is installed above a first portion of a roof deck, and a second roofing material is installed above a second portion of the roof deck which is adjacent the first portion, such that the second roofing material and the roofing material 1410 overlap. In some embodiments, the roofing material 1410 and/or the second roofing material are fastened mechanically to the roof deck. In some embodiments, the second roofing material overlaps the first area 1415A of the roofing material 1410. In some embodiments, the first area 1415A of the roofing material 1410 overlaps the second roofing material. In some embodiments, the flashing grade membrane, such as the fluid flashing material, is applied on the roofing material 1410 and the second roofing material, such that the flashing grade membrane covers at least a portion of the first membrane layer 1416, the second roofing material, and/or the first area 1415A of the substrate 1412. In some embodiments, the flashing grade membrane is cured thereafter. In some embodiments, the flashing grade membrane and/or the fluid flashing material may be as described above.

Figure 13:
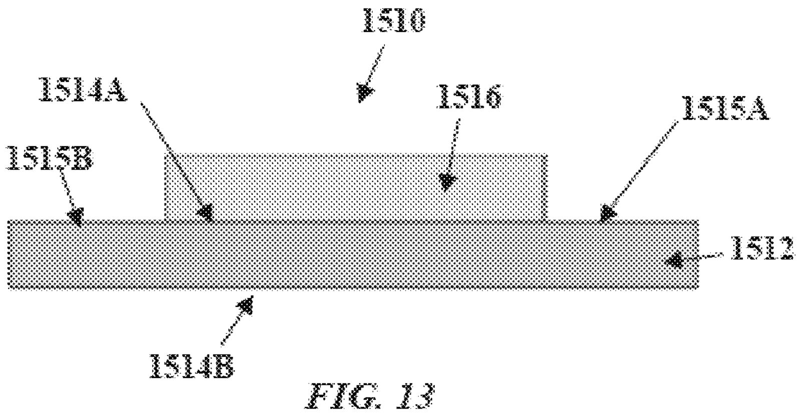
FIG. 13 is a schematic cross-sectional view of a roofing material, in accordance with some embodiments of the invention.

With reference to FIG. 13, in some embodiments, the roofing material 1510 includes (i) a substrate 1512 (e.g., a scrim) having a first side (or top side) 1514A and a second side (or bottom side) 1514B opposite to the first side 1514A, (ii) and a first membrane layer 1516 attached to the first side 1514A of the substrate 1512. In some embodiments, the substrate 1512 is exposed on a first area 1515A of the first side 1514A of the substrate 1512, such that the first membrane layer 1516 does not cover the first area 1515A of the first side 1514A of the substrate 1512 that is exposed. As shown, in some embodiments, the substrate 1512 is also exposed on a second area 1515B of the first side 1514A of the substrate 1512, such that the first membrane layer 1516 does not cover the second area 1515B of the first side 1514A of the substrate 1512 which is exposed. In some embodiments, either or both of the substrate 1512 and/or the first membrane layer 1516 may be in accordance with the substrate and/or membrane layer described above.

As discussed, in some embodiments, the roofing material 1510 is installed above a first portion of a roof deck, and a second roofing material is installed above a second portion of the roof deck which is adjacent the first portion. In some embodiments, the second roofing material and the roofing material 1510 overlap. In some embodiments, the roofing material 1510 and/or the second roofing material are adhered to the roof deck, such as by an adhesive applied to the roof deck. In some embodiments, the second roofing material overlaps at least a portion of the first area 1515A of the roofing material 1510. In some embodiments, the flashing grade membrane, such as the fluid flashing material, is applied on the roofing material 1510 and the second roofing material, such that the flashing grade membrane covers at least a portion of the first membrane layer 1516, the second roofing material, and/or the first area 1515A of the substrate 1512. In some embodiments, the flashing grade membrane is cured thereafter. In some embodiments, the flashing grade membrane and/or the fluid flashing material may be as described above.

In some embodiments, a third roofing material is installed above a third portion of the roof deck which is adjacent the first portion. In some embodiments, the third roofing material is adhered to the roof dec, such as by an adhesive applied to the roof deck. In some embodiments, the third roofing material overlaps at least a portion of the second area 1515B of the roofing material 1510. In some embodiments, the flashing grade membrane, such as the fluid flashing material, is applied on the roofing material 1510 and the third roofing material, such that the flashing grade membrane covers at least a portion of the first membrane layer 1516, the third roofing material, and/or the second area 1515B of the substrate 1512. In some embodiments, the flashing grade membrane is cured thereafter. In some embodiments, the flashing grade membrane and/or the fluid flashing material may be as described above.

Figure 14:
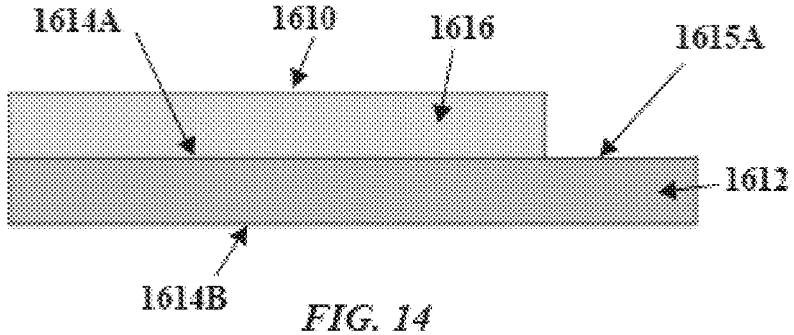
FIG. 14 is a schematic cross-sectional view of a roofing material, in accordance with some embodiments of the invention.

With reference to FIG. 14, in some embodiments, the roofing material 1610 includes (i) a substrate 1612 (e.g., a scrim) having a first side (or top side) 1614A and a second side (or bottom side) 1614B opposite to the first side 1614A, and (ii) a first membrane layer 1616 attached to the first side 1614A of the substrate 1612. In some embodiments, the substrate 1612 is exposed on a first area 1615A of the first side 1614A of the substrate 1612, such that the first membrane layer 1616 does not cover the first area 1615A of the first side 1614A of the substrate 1612 that is exposed. In some embodiments, either or both of the substrate 1612 and/or the first membrane layer 1616 may be in accordance with the substrate and/or membrane layer described above.

As discussed, in some embodiments, the roofing material 1610 is installed above a first portion of a roof deck, and a second roofing material is installed above a second portion of the roof deck which is adjacent the first portion. In some embodiments, the second roofing material and the roofing material 1610 overlap. In some embodiments, either or both of the roofing material 1610 and the second roofing material are adhered to the roof deck, such as by an adhesive applied to the roof deck. In some embodiments, the second roofing material overlaps at least a portion of the first area 1615A of the roofing material 1610. In some embodiments, a flashing grade membrane, such as the fluid flashing material, is applied on the roofing material 1610 and the second roofing material, such that the flashing grade membrane covers at least a portion of the first membrane layer 1616, the second roofing material, and/or the first area 1615A of the substrate 1612. In some embodiments, the flashing grade membrane is cured thereafter. In some embodiments, the flashing grade membrane and/or the fluid flashing material may be as described above.

In some embodiments, including those shown in FIGS. 9-14, the roofing material may include a barrier layer, and a second substrate, where the barrier layer is between the first and second substrates. In some embodiments, the barrier layer may comprise at least one of a thermoplastic polyolefin (TPO), a polyethylene terephthalate (PET), a polypropylene (PP), a PET fabric reinforcement, a polyurethane, or any combination thereof. In some embodiments, the barrier layer may act as a barrier to the adhesive applied to the roof deck. In some embodiments, including those in shown in FIGS. 13 and 14, the roofing material may include the barrier layer without a second substrate, such that the substrate is between the barrier layer and the first membrane layer.

Figure 15:
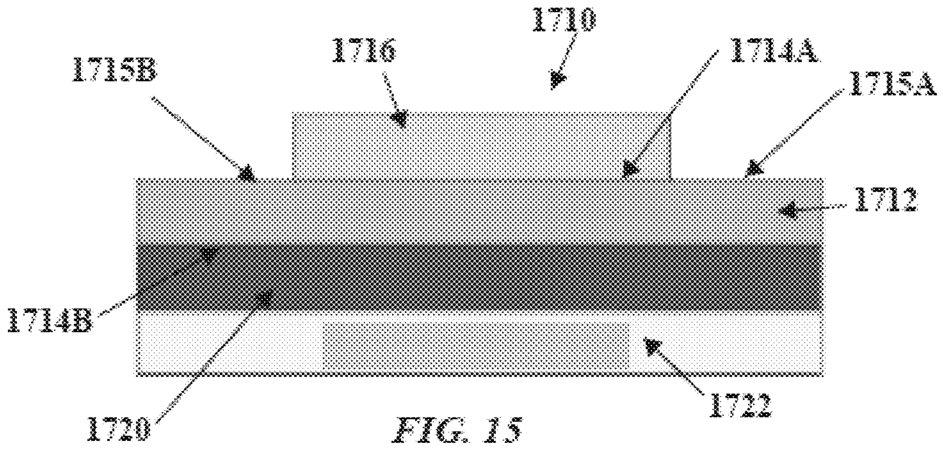
FIG. 15 is a schematic cross-sectional view of a roofing material, in accordance with some embodiments of the invention.

With reference to FIG. 15, in some embodiments, the roofing material 1710 includes (i) a substrate 1712 (e.g., a scrim) having a first side (or top side) 1714A and a second side (or bottom side) 1714B opposite to the first side 1714A, (ii) a first membrane layer 1716 attached to the first side 1714A of the substrate 1712, and (iii) an adhesive layer 1720 covered by a release liner 1722 attached to the second side 1714B of the substrate 1712. In some embodiments, the substrate 1712 is exposed on a first area 1715A of the first side 1714A of the substrate 1712, such that the first membrane layer 1716 does not cover the first area 1715A of the first side 1714A of the substrate 1712 that is exposed. As shown, in some embodiments, the substrate 1712 is also exposed on a second area 1715B of the first side 1714A of the substrate 1712, such that the first membrane layer 1716 does not cover the second area 1715B of the first side 1714A of the substrate 1712 that is exposed. In some embodiments, one or more of the substrate 1712, the first membrane layer 1716, and/or the adhesive layer 1720 may be in accordance with the substrate, membrane layer, and/or adhesive layer described above.

As discussed, in some embodiments, the roofing material 1710 is installed above a first portion of a roof deck, and a second roofing material is installed above a second portion of the roof deck which is adjacent the first portion. In some embodiments, the second roofing material and the roofing material 1710 overlap. In some embodiments, the second roofing material and the roofing material 1710 abut one another. In some embodiments, the roofing material 1710 and/or the second roofing material are adhered to the roof deck, such as by removing one or more release liners from one or more adhesive layers. In some embodiments, the second roofing material overlaps at least a portion of the first area 1715A of the roofing material 1710. In some embodiments, the flashing grade membrane, such as the fluid flashing material, is applied on the roofing material 1710 and the second roofing material, such that the flashing grade membrane covers at least a portion of the first membrane layer 1716, the second roofing material, and/or the first area 1715A of the substrate 1712. In some embodiments, the flashing grade membrane is cured thereafter. In some embodiments, the flashing grade membrane and/or the fluid flashing material may be as described above.

In some embodiments, a third roofing material is installed above a third portion of the roof deck which is adjacent the first portion. In some embodiments, the third roofing material and the roofing material 1710 overlap. In some embodiments, the third roofing material and the roofing material 1710 abut one another. In some embodiments, the third roofing material is adhered to the roof deck, such as by removing a release liner from an adhesive layer. In some embodiments, the third roofing material overlaps at least a portion of the second area 1715B of the roofing material 1710. In some embodiments, the flashing grade membrane, such as the fluid flashing material, is applied on the roofing material 1710 and the third roofing material, such that the flashing grade membrane covers at least a portion of the first membrane layer 1716, the third roofing material, and/or the second area 1715B of the substrate 1712. In some embodiments, the flashing grade membrane is cured thereafter. In some embodiments, the flashing grade membrane and/or the fluid flashing material may be as described above.

Figure 16:
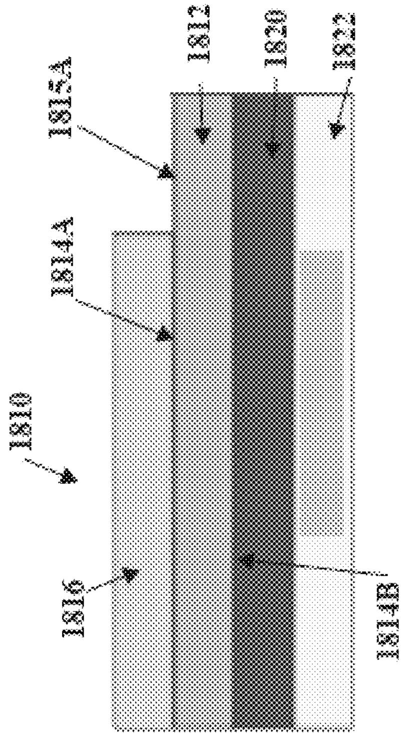
FIG. 16 is a schematic cross-sectional view of a roofing material, in accordance with some embodiments of the invention.

With reference to FIG. 16, in some embodiments, the roofing material 1810 includes (i) a substrate 1812 (e.g., a scrim) having a first side (or top side) 1814A and a second side (or bottom side) 1814B opposite to the first side 1814A, (ii) a first membrane layer 1816 attached to the first side 1814A of the substrate 1812, and (iii) an adhesive layer 1820 covered by a release liner 1822 attached to the second side 1814B of the substrate 1812. In some embodiments, the substrate 1812 is exposed on a first area 1815A of the first side 1814A of the substrate 1812, such that the first membrane layer 1816 does not cover the first area 1815A of the first side 1814A of the substrate 1812 that is exposed. In some embodiments, one or more of the substrate 1812, the first membrane layer 1816, and/or the adhesive layer 1820 may be in accordance with the substrate, membrane layer, and/or adhesive layer described above.

As discussed, in some embodiments, the roofing material 1810 is installed above a first portion of a roof deck, and a second roofing material is installed above a second portion of the roof deck which is adjacent the first portion. In some embodiments, the second roofing material and the roofing material 1810 overlap. In some embodiments, the second roofing material and the roofing material 1810 abut one another. In some embodiments, the roofing material 1810 and/or the second roofing material are adhered to the roof deck, such as by removing one or more release liners from one or more adhesive layers. In some embodiments, the second roofing material overlaps at least a portion of the first area 1815A of the roofing material 1810. In some embodiments, the flashing grade membrane, such as the fluid flashing material, is applied on the roofing material 1810 and the second roofing material, such that the flashing grade membrane covers at least a portion of the first membrane layer 1816, the second roofing material, and/or the first area 1815A of the substrate 1812. In some embodiments, the flashing grade membrane is cured thereafter. In some embodiments, the flashing grade membrane and/or the fluid flashing material may be as described above.

Figure 17:
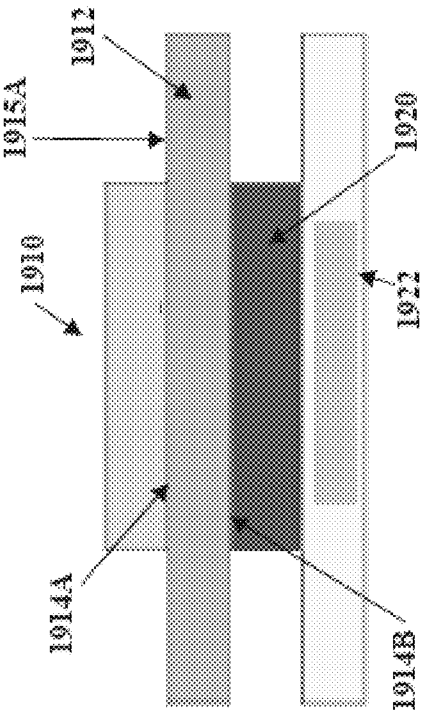
FIG. 17 is a schematic cross-sectional view of a roofing material, in accordance with some embodiments of the invention.

With reference to FIG. 17, in some embodiments, the roofing material 1910 includes (i) a substrate 1912 (e.g., a scrim) having a first side (or top side) 1914A and a second side (or bottom side) 1914B opposite to the first side 1914A, (ii) a first membrane layer 1916 attached to the first side 1914A of the substrate 1912, and (iii) an adhesive layer 1920 covered by a release liner 1922 attached to the second side 1914B of the substrate 1912. In some embodiments, the substrate 1912 is exposed on a first area 1915A of the first side 1914A and the second side 1914B of the substrate 1912, such that the first membrane layer 1916 and the adhesive layer 1920 do not cover the first area 1915A of the substrate 1912 which is exposed. In some embodiments, the substrate 1912 is exposed on a second area 1915B of the first side 1914A and the second side 1914B of the substrate 1912, such that the first membrane layer 1916 and the adhesive layer 1920 do not cover the second area 1915B of the substrate 1912 which is exposed. In some embodiments, one or more of the substrate 1912, the first membrane layer 1916, and/or the adhesive layer 1920 may be in accordance with the substrate, membrane layer, and/or adhesive layer described above.

As discussed, in some embodiments, the roofing material 1910 is installed above a first portion of a roof deck, and a second roofing material is installed above a second portion of the roof deck which is adjacent the first portion. In some embodiments, the second roofing material and the roofing material 1910 overlap. In some embodiments, the roofing material 1910 and/or the second roofing material are adhered to the roof deck, such as by removing one or more release liners from one of more adhesive layers. In some embodiments, the second roofing material overlaps the first area 1915A of the roofing material 1910. In some embodiments, the first area 1915A of the roofing material 1910 overlaps the second roofing material. In some embodiments, the flashing grade membrane, such as the fluid flashing material, is applied on the roofing material 1910 and the second roofing material, such that the flashing grade membrane covers at least a portion of the first membrane layer 1916, the second roofing material, and/or the first area 1915A of the substrate 1912. In some embodiments, the flashing grade membrane is cured thereafter. In some embodiments, the flashing grade membrane and/or the fluid flashing material may be as described above.

As discussed, in some embodiments, a third roofing material is installed above a third portion of the roof deck which is adjacent the first portion. In some embodiments, the third roofing material and the roofing material 1910 overlap. In some embodiments, the third roofing material is adhered to the roof deck, such as by removing one or more release liners from one or more adhesive layers. In some embodiments, the third roofing material overlaps the second area 1915B of the roofing material 1910. In some embodiments, the second area 1915B of the roofing material 1910 overlaps the third roofing material. In some embodiments, the flashing grade membrane, such as the fluid flashing material, is applied on the roofing material 1910 and the third roofing material, such that the flashing grade membrane covers at least a portion of the first membrane layer 1916, the third roofing material, and/or the second area 1915B of the substrate 1912. In some embodiments, the flashing grade membrane is cured thereafter. In some embodiments, the flashing grade membrane and/or the fluid flashing material may be as described above.

Figure 18:
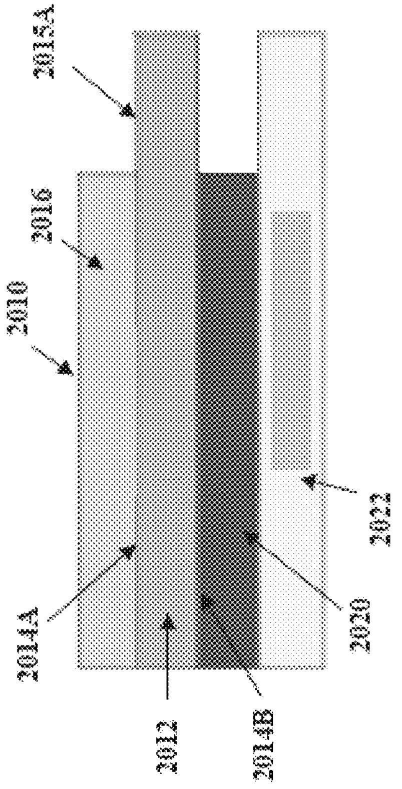
FIG. 18 is a schematic cross-sectional view of a roofing material, in accordance with some embodiments of the invention.

With reference to FIG. 18, in some embodiments, the roofing material 2010 includes (i) a substrate 2012 (e.g., a scrim) having a first side (or top side) 2014A and a second side (or bottom side) 2014B opposite to the first side 2014A, (ii) a first membrane layer 2016 attached to the first side 2014A of the substrate 2012, and (iii) an adhesive layer 2020 covered by a release liner 2022 attached to the second side 2014B of the substrate 2012. In some embodiments, the substrate 2012 is exposed on a first area 2015A of the first side 2014A and the second side 2014B of the substrate 2012, such that the first membrane layer 2016 and the adhesive layer 2020 do not cover the first area 2015A of the substrate 2012 which is exposed. In some embodiments, one or more of the substrate 2012, the first membrane layer 2016, and/or the adhesive layer 2020 may be in accordance with the substrate, membrane layer, and/or adhesive layer described above.

As discussed, in some embodiments, the roofing material 2010 is installed above a first portion of a roof deck, and a second roofing material is installed above a second portion of the roof deck which is adjacent the first portion. In some embodiments, the second roofing material and the roofing material 2010 overlap. In some embodiments, the roofing material 2010 and/or the second roofing material are adhered to the roof deck, such as by removing one or more release liners from one of more adhesive layers. In some embodiments, the second roofing material overlaps the first area 2015A of the roofing material 2010. In some embodiments, the first area 2015A of the roofing material 2010 overlaps the second roofing material. In some embodiments, the flashing grade membrane, such as the fluid flashing material, is applied on the roofing material 2010 and the second roofing material, such that the flashing grade membrane covers at least a portion of the first membrane layer 2016, the second roofing material, and/or the first area 2015A of the substrate 2012. In some embodiments, the flashing grade membrane is cured thereafter. In some embodiments, the flashing grade membrane and/or the fluid flashing material may be as described above.

In some embodiments, including those shown in FIGS. 15, 16, 17, and 18, the roofing material may include a barrier layer or film between the substrate and the adhesive layer. In some embodiments, the barrier layer may act as a barrier to the adhesive layer. In some embodiments, the barrier layer may be as described herein.

Figure 19:
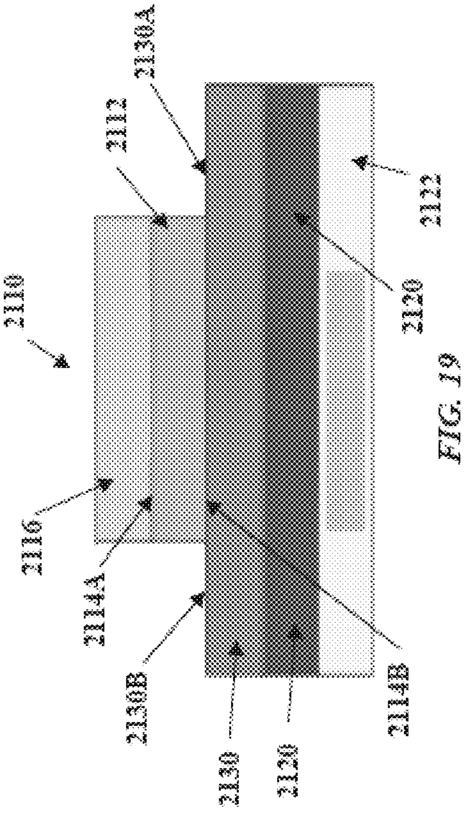
FIG. 19 is a schematic cross-sectional view of a roofing material, in accordance with some embodiments of the invention.

With reference to FIG. 19, in some embodiments, the roofing material 2110 includes (i) a substrate 2112 (e.g., a scrim), (ii) a first membrane layer 2116 attached to the first side 2114A of the substrate 2112, (iii) a barrier layer 2130 attached to the second side 2114B of the substrate 2112, and (iv) an adhesive layer 2120 covered by a release liner 2122 which is attached to the barrier layer 2130. In some embodiments, the barrier layer 2130 is exposed on a first area 2130A, such that the first membrane layer 2116 and the substrate 2112 do not cover the first area 2130A of the barrier layer 2130 which is exposed. As shown, in some embodiments, the barrier layer 2130 is also exposed on a second area 2130B, such that the first membrane layer 2116 and the substrate 2112 does not cover the second area 2130B of the barrier layer 2130 which is exposed. In some embodiments, one or more of the substrate 2112, the first membrane layer 2116, the barrier layer 2130, and/or the adhesive layer 2120 may be in accordance with the substrate, membrane layer, barrier layer, and/or adhesive layer as described above.

As discussed, in some embodiments, the roofing material 2110 is installed above a first portion of a roof deck, and a second roofing material is installed above a second portion of the roof deck which is adjacent the first portion. In some embodiments, the second roofing material and the roofing material 2110 overlap. In some embodiments, the second roofing material and the roofing material 2110 abut one another. In some embodiments, the roofing material 2110 and/or the second roofing material are adhered to the roof deck, such as by removing one or more release liners from one or more adhesive layers. In some embodiments, the second roofing material overlaps at least a portion of the first area 2130A of the roofing material 2110. In some embodiments, the flashing grade membrane, such as the fluid flashing material, is applied on the roofing material 2110 and the second roofing material, such that the flashing grade membrane covers at least a portion of the first membrane layer 2116, the second roofing material, and/or the first area 2130A of the barrier layer 2130. In some embodiments, the flashing grade membrane is cured thereafter. In some embodiments, the flashing grade membrane and/or the fluid flashing material may be as described above.

In some embodiments, a third roofing material is installed above a third portion of the roof deck which is adjacent the first portion. In some embodiments, the third roofing material and the roofing material 2110 overlap. In some embodiments, the third roofing material and the roofing material 2110 abut one another. In some embodiments, the third roofing material is adhered to the roof deck, such as by removing a release liner from an adhesive layer. In some embodiments, the third roofing material overlaps at least a portion of the second area 2130B of the roofing material 2110. In some embodiments, the flashing grade membrane, such as the fluid flashing material, is applied on the roofing material 2110 and the third roofing material, such that the flashing grade membrane covers at least a portion of the first membrane layer 2116, the third roofing material, and/or the second area 2130B of the barrier layer 2130. In some embodiments, the flashing grade membrane is cured thereafter. In some embodiments, the flashing grade membrane and/or the fluid flashing material may be as described above.

Figure 20:
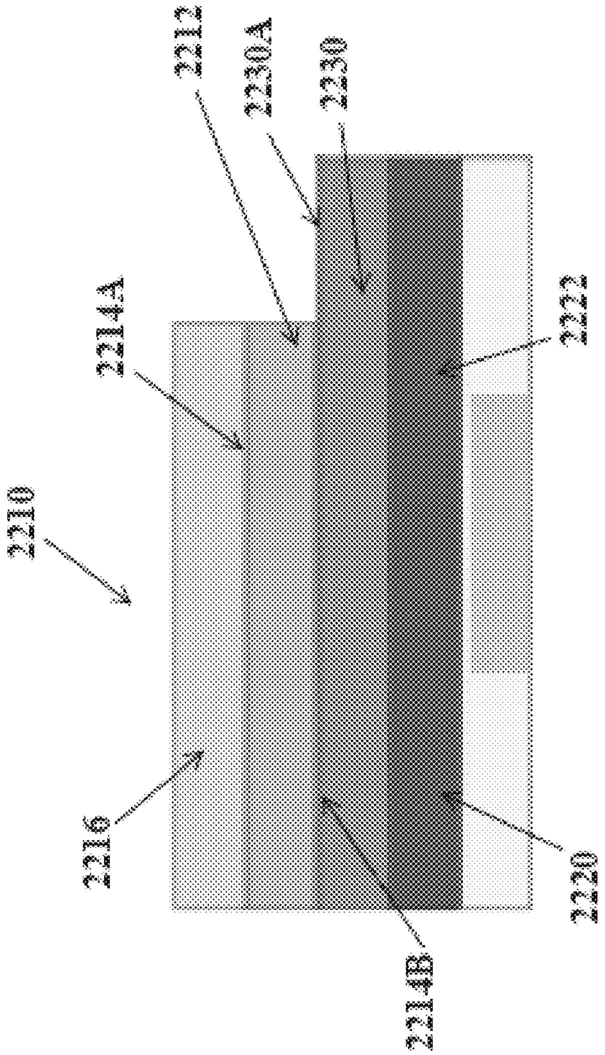
FIG. 20 is a schematic cross-sectional view of a roofing material, in accordance with some embodiments of the invention.

With reference to FIG. 20, in some embodiments, the roofing material 2210 includes (i) a substrate 2212 (e.g., a scrim), (ii) a first membrane layer 2216 attached to the first side 2214A of the substrate 2212, (iii) a barrier layer 2230 attached to the second side 2214B of the substrate 2212, and (iv) an adhesive layer 2220 covered by a release liner 2222 which is attached to the barrier layer 2230. In some embodiments, the barrier layer 2230 is exposed on a first area 2230A, such that the first membrane layer 2216 and the substrate 2212 do not cover the first area 2230A of the barrier layer 2230 which is exposed. In some embodiments, one or more of the substrate 2212, the first membrane layer 2216, the barrier layer 2230, and/or the adhesive layer 2220 may be in accordance with the substrate, membrane layer, barrier layer, and/or adhesive layer described above.

As discussed, in some embodiments, the roofing material 2010 is installed above a first portion of a roof deck, and a second roofing material is installed above a second portion of the roof deck which is adjacent the first portion. In some embodiments, the second roofing material and the roofing material 2010 overlap. In some embodiments, the second roofing material and the roofing material 2010 abut one another. In some embodiments, the roofing material 2010 and/or the second roofing material are adhered to the roof deck, such as by removing one or more release liners from one or more adhesive layers. In some embodiments, the second roofing material overlaps at least a portion of the first area 2030A of the roofing material 2010. In some embodiments, the flashing grade membrane, such as the fluid flashing material, is applied on the roofing material 2010 and the second roofing material, such that the flashing grade membrane covers at least a portion of the first membrane layer 2016, the second roofing material, and/or the first area 2030A of the barrier layer 2030. In some embodiments, the flashing grade membrane is cured thereafter. In some embodiments, the flashing grade membrane and/or the fluid flashing material may be as described above.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system, comprising:
- a roof deck;
- a first roofing material installed on the roof deck;
- a second roofing material installed on the roof deck, adjacent to the first roofing material,
  - wherein the second roofing material comprises:
    - a first layer comprising silicone; and
    - a first substrate,
      - wherein the first layer partially covers a surface of the first substrate, thereby to provide at least a first area of the surface of the first substrate not covered by the first layer,
      - wherein the first roofing material overlaps at least a portion of the first area; and
- a flashing material comprising silicone, wherein the flashing material covers a portion of each of:

the first roofing material, and the first layer of the second roofing material.

2. The system of claim 1, wherein the first area is at a first edge of the second roofing material.

3. The system of claim 2, wherein the first layer partially covers a surface of the first substrate, thereby to provide a second area of the first substrate not covered by the first layer, wherein the second area is at a second edge of the second roofing material.

4. The system of claim 1, wherein the second roofing material further comprises a second layer, wherein the second layer comprises silicone, and wherein the second layer at least partially covers a surface of the first substrate opposite the surface covered by the first layer.

5. The system of claim 1, wherein the second roofing material further comprises:

an adhesive layer, wherein the adhesive layer adheres the second roofing material to the roof deck.

6. The system of claim 1, wherein the second roofing material further comprises a barrier layer, wherein the barrier layer at least partially covers a surface of the first substrate opposite the surface covered by the first layer.

7. The system of claim 6, wherein the second roofing material further comprises a second substrate, wherein the barrier layer is between the first substrate and the second substrate.

8. The system of claim 7, further comprising:

at least one mechanical fastener disposed through the second roofing material and the roof deck.

9. The system of claim 7, wherein the second roofing material further comprises an adhesive layer.

10. The system of claim 9, wherein the barrier layer is between the first substrate and the adhesive layer.

* * * * *